(12) United States Patent
Morinaga et al.

(10) Patent No.: US 10,620,495 B2
(45) Date of Patent: Apr. 14, 2020

(54) LIQUID CRYSTAL DISPLAY DEVICE

(71) Applicant: Sharp Kabushiki Kaisha, Sakai, Osaka (JP)

(72) Inventors: Junichi Morinaga, Sakai (JP); Hikaru Yoshino, Sakai (JP); Shogo Suzuki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/276,654

(22) Filed: Feb. 15, 2019

(65) Prior Publication Data

US 2019/0258124 A1   Aug. 22, 2019

(30) Foreign Application Priority Data

Feb. 21, 2018 (JP) ................ 2018-028631

(51) Int. Cl.
*G02F 1/1362* (2006.01)
*G02F 1/1337* (2006.01)
*G02F 1/1335* (2006.01)
*G02F 1/1343* (2006.01)

(52) U.S. Cl.
CPC .. *G02F 1/136209* (2013.01); *G02F 1/133512* (2013.01); *G02F 1/133707* (2013.01); *G02F 1/136286* (2013.01); *G02F 2001/134318* (2013.01); *G02F 2001/134345* (2013.01); *G02F 2001/134372* (2013.01); *G02F 2201/40* (2013.01)

(58) Field of Classification Search
None
See application file for complete search history.

(56) References Cited

U.S. PATENT DOCUMENTS

| | | |
|---|---|---|
| 2014/0211133 A1 | 7/2014 | Huh et al. |
| 2015/0212375 A1 | 7/2015 | Park et al. |
| 2015/0261048 A1* | 9/2015 | Chae ................. G02F 1/134363 349/42 |
| 2016/0223855 A1 | 8/2016 | Kobayashi |
| 2016/0349587 A1* | 12/2016 | Park ................. G02F 1/136286 |
| 2017/0023813 A1 | 1/2017 | Park et al. |

FOREIGN PATENT DOCUMENTS

| | | |
|---|---|---|
| JP | 2015-138267 A | 7/2015 |
| JP | 2016-142943 A | 8/2016 |

* cited by examiner

*Primary Examiner* — Phu Vu
(74) *Attorney, Agent, or Firm* — Keating & Bennett, LLP

(57) ABSTRACT

The present invention provides a liquid crystal display device which includes: a first substrate; a second substrate; and a light-shielding member disposed between adjacent sub-pixels having different colors, the first substrate includes a second electrode provided with a slit, the slit includes a main slit extending in a first direction and a sub-slit extending in a second direction, when the light-shielding member is provided on the first substrate, the light-shielding member is widened on a side of a closer sub-slit among the sub-slits formed in the sub-pixels that have different colors and disposed on both sides of the light-shielding member, and the light-shielding member is not widened on a side of a farther sub-slit, and when the light-shielding member is provided on the second substrate, the light-shielding member is widened on the side opposite to the case of the first substrate.

7 Claims, 21 Drawing Sheets

LIQUID CRYSTAL DISPLAY DEVICE

CROSS-REFERENCE TO RELATED APPLICATIONS

The present application claims priority under 35 U.S.C. § 119 to Japanese Patent Application No. 2018-028631 filed on Feb. 21, 2018, the contents of which are incorporated herein by reference in their entirety.

BACKGROUND OF THE INVENTION

Field of the Invention

The present invention relates to a liquid crystal display device. In particular, the present invention relates to a liquid crystal display device in a horizontal alignment mode.

Description of Related Art

A liquid crystal display device is a display device that uses a liquid crystal composition for display. In a representative display method, a voltage is applied to a liquid crystal composition sealed between a pair of substrates, and an alignment state of liquid crystal molecules in the liquid crystal composition is changed according to the applied voltage, thereby controlling a light transmission amount. The liquid crystal display device is used in a wide range of fields by utilizing the features such as thinness, light weight, and low power consumption.

As a display method of the liquid crystal display device, attention is paid to a horizontal alignment mode in which control is performed by mainly rotating the alignment of the liquid crystal molecules in a plane parallel to a substrate surface because a wide viewing angle characteristic is easily obtained. For example, in recent years, an in-plane switching (IPS) mode or a fringe field switching (FFS) mode that is one type of the horizontal alignment mode is widely used in the liquid crystal display devices for smartphones and tablet terminals.

As a technique relating to the liquid crystal display device in the horizontal alignment mode, for example, JP 2016-142943 A discloses a liquid crystal display device including an array substrate in which a signal line, a scanning line, and a pixel electrode are arranged in an image display region, the array substrate including a resin film, a counter substrate, and a liquid crystal material layer sandwiched between the array substrate and the counter substrate. In the liquid crystal display device, a protrusion thread that extends along a signal line so as to cover the signal line is integrally provided on the array substrate by a resin layer constituting a resin film in the image display region, and an apex of the protrusion thread is separated from an inner surface of the counter substrate.

JP 2015-138267 A discloses a liquid crystal display device including a first substrate, a gate line including a gate electrode, a data line including a source electrode, a drain electrode, an organic film that is formed on the gate line, the data line, and the drain electrode and includes a first opening, a first electrode that is formed on the organic film and includes a second opening, a protective film that is formed on the first electrode and includes a contact hole from which the drain electrode is exposed, and a second electrode formed on the protective film. In the liquid crystal display device, a linear interval between a first edge parallel to the gate line in a periphery of the gate electrode and a second edge that is parallel to the gate line in a periphery of the second opening of the first electrode and is adjacent to the first edge ranges from about 0 μm to about 6 μm.

BRIEF SUMMARY OF THE INVENTION

FIG. 17 is a view illustrating a liquid crystal display device according to a comparative embodiment, and is a schematic cross-sectional view in the case that a CF substrate deviates to a left side in bonding of a TFT substrate and the CF substrate. A liquid crystal display device 1R of the comparative embodiment includes a TFT substrate 10R including a thin-film transistor (TFT), a CF substrate 20R including a color filter (CF), and a liquid crystal layer 30R sandwiched between the TFT substrate 10R and the CF substrate 20R. A data line 131R, a common electrode 15R, a metal line (third metal line) 18R, and a pixel electrode 17R are provided on the TFT substrate 10R.

In the CF substrate 20R, sometimes a black matrix 22R disposed at a color boundary of a color filter 23R is fined to secure an aperture ratio. However, in the case that a deviation exists in bonding of the TFT substrate 10R and the CF substrate 20R, light is transmitted in an oblique direction as indicated by an arrow in FIG. 17, and unintentional color leaks from oblique-view to generate color mixture. This phenomenon is also referred to as oblique-view color mixture. The oblique-view color mixture is particularly affected by an angle of a slit provided in the pixel electrode 17R. This point will be described below using the liquid crystal display device 1R of the comparative embodiment.

FIG. 18 is a schematic plan view illustrating the liquid crystal display device of the comparative embodiment. FIG. 19 is a view illustrating the liquid crystal display device of the comparative embodiment, and is a schematic cross-sectional view in the case that the deviation is not generated between the TFT substrate and the CF substrate in bonding of the TFT substrate and the CF substrate. FIG. 20 is a view illustrating the liquid crystal display device of the comparative embodiment, and is a schematic cross-sectional view in the case that the deviation is generated between the TFT substrate and the CF substrate in bonding of the TFT substrate and the CF substrate. FIGS. 19 and 20 are schematic cross-sectional views of three sub-pixels along direction a-b in FIG. 18, and are schematic cross-sectional views of a sub-slit (to be described later) provided in the pixel electrode.

The TFT substrate 10R included in the liquid crystal display device 1R of the comparative embodiment includes a plurality of data lines 131R, a plurality of scanning lines 132R intersecting the plurality of data lines 131R, and the TFT as a switching element. The TFT substrate 10R includes a first insulating substrate 11R, a first insulating film 12R, the data line 131R, a second insulating film 14R, a common electrode 15R, a interlayer insulating film 16R, and a pixel electrode 17R in which a slit 171R is provided sequentially toward the side of the liquid crystal layer 30R. The liquid crystal display device 1R of the comparative embodiment is an FFS mode liquid crystal display device.

The pixel electrode 17R is provided in each sub-pixel 2R, a plurality of slits 171R parallel to each other are provided in each pixel electrode 17R, and each slit 171R includes two main slits 171aR extending in directions D1R and D3R. Two sub-slits 171bR extending in a direction D2R are connected to both ends of each main slit 171aR extending in the direction D1R, and two sub-slits 171bR extending in a direction D4R are connected to both ends of each main slit 171aR extending in the direction D3R. An angle formed by a long axis 311R of the liquid crystal molecule 31R in an initial alignment state and the direction D1R is equal to an angle formed by the long axis 311R of the liquid crystal molecule 31R in the initial alignment state and the direction D3R. Similarly, an angle formed by the long axis 311R of the liquid crystal molecule 31R in the initial alignment state and the direction D2R is equal to an angle formed by the long axis 311R of the liquid crystal molecule 31R in the initial alignment state and the direction D4R. Each slit 171R has a line-symmetrical shape with respect to a center line between the sub-slit 171bR extending in the direction D2R and the sub-slit 171bR extending in the direction D4R, the sub-slit 171bR extending in the direction D2R and the sub-slit 171bR extending in the direction D4R being disposed in a central portion of each pixel electrode 17R.

The liquid crystal layer 30R includes liquid crystal molecules 31R having positive anisotropy of dielectric constant, and an angle formed between an axial direction with a larger dielectric constant selected from the long axis 311R direction and a short axis 312R direction (i.e., long axis 311R direction) of each liquid crystal molecule 31R in the initial alignment state and the direction D2R or D4R is larger than an angle formed between the axial direction (long axis 311R direction) and the direction D1R or D3R.

The CF substrate 20R includes a second insulating substrate 21R, a black matrix 22R, a color filter 23R, and an overcoat layer 24R sequentially toward the side of the liquid crystal layer 30R.

In the liquid crystal display device 1R, one pixel 3R is constructed with three sub-pixels 2R, and a red sub-pixel RR, a green sub-pixel GR, and a blue sub-pixel BR are disposed in one pixel 3R. The case that the green sub-pixel GR is in a lighting state (white control) and the red sub-pixel RR and the blue sub-pixel BR located on both sides of the green sub-pixel GR are in a non-lighting state (black control) will be described below by way of example.

In the liquid crystal display device 1R of the comparative embodiment, as illustrated in FIG. 18, the slit 171R of the pixel electrode 17R disposed to provide the fringe electric field is inclined at a certain angle with respect to the perpendicular direction (on a surface of paper). In the liquid crystal display device 1R of the comparative embodiment that is the FFS mode liquid crystal display device, the long axis 311R (also referred to as the initial alignment axis) of the liquid crystal molecules 31R in the initial alignment state is set perpendicular (on the surface of paper), and an angle is given to the slit 171R provided in the pixel electrode 17R with respect to the long axis 311R of the liquid crystal molecules 31R. Consequently, the liquid crystal molecules 31R can be rotated in a fixed direction, and the alignment of the liquid crystal molecules 31R can be controlled by voltage control. In the comparative embodiment, because the liquid crystal molecules 31R having positive anisotropy of dielectric constant are used, the initial alignment axis is set perpendicular (on the surface of paper). Alternatively, the liquid crystal molecules 31R having negative anisotropy of dielectric constant can also be used instead of the liquid crystal molecules 31R having positive anisotropy of dielectric constant. In this case, the initial alignment axis may be set horizontal (the crosswise direction on the surface of paper).

Because the pixel electrode 17R vertically divides the inside of the same sub-pixel 2R and has two angles of the main slit 171aR, the rotation direction of the alignment of the liquid crystal molecules 31R becomes inverted in the vicinity of the center of the sub-pixel 2R, and a disturbance due to alignment collision of the liquid crystal molecules 31R is generated in the vicinity of a central portion X of the sub-pixel. The sub-slit 171bR (folded portion) that is further inclined by an angle larger than that of the main slit 171aR is provided in the central portion X of the sub-pixel in order to reduce the region where the disturbance due to the alignment collision of the liquid crystal molecules 31R is generated. In the upper end Y of the sub-pixel and the lower end Z of the sub-pixel, the fringe electric field is also generated in the perpendicular direction of the sub-pixel 2R at the end of the slit 171R, and an undesirable electric field is generated for the alignment to be controlled. In this case, the sub-slit 171bR that is further inclined by an angle larger than that of the main slit 171aR is also provided in order to reduce the region where the disturbance of the alignment of the liquid crystal molecules 31R is generated. As described above, in the FFS mode liquid crystal display device 1R, in order to suppress the disturbance of the alignment of the liquid crystal molecules 31R, the sub-slit 171bR having an angle different from that of the main slit 171aR is provided at an alignment control region end (upper and lower ends of the opening (slit 171) and the central portion) in the design of the sub-pixel 2R. In the description, the upper end and the lower end are also referred to as upper and lower ends.

The sub-slit 171bR is set such that the angle formed between the initial alignment axis and the sub-slit 171bR is larger than the angle formed between the initial alignment axis (90° (perpendicular)) and the main slit 171aR. Thus, the main slit 171aR and the sub-slit 171bR are largely different from each other in an electric field control angle for the initial alignment axis (black control), and the liquid crystal molecules 31R move even with a slight potential difference in the sub-slit 171bR. Thus, in a region 100R between the adjacent sub-pixels 2R, the liquid crystal molecules 31R rotate easily by the fringe electric field in the vicinity of the sub-slit 171bR. For this reason, even in the region 100R outside the sub-pixel 2R where the light transmission is undesirable, the liquid crystal molecules 31R rotate by the fringe electric field in the vicinity of the sub-slit 171bR, and there is a possibility that the liquid crystal molecules 31R exhibit light transmission. The region where the sub-slit 171bR is disposed is a region where the alignment of the liquid crystal molecules 31R is easily disturbed as described above, and the vicinity of the sub-slit 171bR is a region where the alignment of the liquid crystal molecules 31R is hardly controlled even if the sub-slit 171bR is provided. Thus, in the vicinity of the sub-slit 171bR in the region 100R outside the sub-pixel 2R, there is a possibility of the light transmission due to unexpected alignment of the liquid crystal molecules 31R.

As illustrated in FIG. 19, in the case that the liquid crystal display device 1R in which the deviation is not generated in bonding of the TFT substrate 10R and the CF substrate 20R is observed from an oblique direction, the light of a broken arrow that is incident from one (green sub-pixel GR) of the adjacent sub-pixels 2R having different colors toward the other sub-pixel (blue sub-pixel BR) passes through the region 100R between the adjacent sub-pixels 2R, but the oblique-view color mixture is not generated because the light is shielded by the black matrix 22R.

However, in the case that the liquid crystal display device 1R, in which the deviation is generated in the bonding of the TFT substrate 10R and the CF substrate 20R to deviate the black matrix 22R onto the left side as illustrated in FIG. 20, is obliquely viewed from the side of the blue sub-pixel BR with respect to the green sub-pixel GR, sometimes the oblique-view color mixture in which the green display looks blue is generated. This is because after passing through the region 100R exhibiting the light transmission between the adjacent sub-pixels 2R, the oblique light of the broken arrow that is incident from the green sub-pixel GR in the lighting state toward the blue sub-pixel BR in the non-lighting state is transmitted through the black matrix 22R without being shielded by the black matrix 22R, and the blue light comes out from the blue sub-pixel BR in the non-lighting state.

As described above, in the region 100R outside the sub-pixel 2R, where the light transmission is undesirable, because the liquid crystal molecules 31R rotate by the fringe electric field or the alignment disturbance of the liquid crystal molecules 31R is generated in the vicinity of the sub-slit 171bR, the light tends to pass obliquely from a part of the black-controlled sub-pixel 2R to generate a display defect (oblique-view color mixture), which results in degradation of display quality. This is particularly conspicuous in the case that a distance between adjacent sub-pixels 2R becomes small in a high definition pixel, and this tends to be easily generated in the case that the black matrix 22R disposed at a color boundary has a small width.

At this point, in the case that the liquid crystal molecules 31R can be controlled to the black display in the region 100R between the adjacent sub-pixels 2R, the oblique-view color mixture is not generated because the oblique light is shielded by the liquid crystal layer 30R. For example, in the case that the adjacent sub-pixels 2R are sufficiently separated from each other, a region where the fringe electric field generated between the pixel electrode 17R and the common electrode 15R does not reach can be provided at the boundary of the sub-pixels 2R, and the oblique light is shielded by the liquid crystal layer 30R but cannot be transmitted. In this case, a special light-shielding measure is not required. However, the region that cannot be controlled by the pixel electrode 17R is enlarged, which results in reduction of transmittance. In the case that definition of the pixel is increased, sometimes a space between the adjacent sub-pixels 2R is narrowed to secure the transmittance. At this point, the control of the liquid crystal molecules 31R at the boundary of the sub-pixels 2R is strongly influenced by a pixel control potential, which raises a concern about the oblique-view color mixture.

With reference to FIG. 21, the oblique-view color mixture will further be described. FIG. 21 is a schematic plan view illustrating light leakage of the liquid crystal display device of the comparative embodiment. Similarly to the central portion of the sub-pixel 2R, the liquid crystal molecules 31R respond by the fringe electric field generated between the pixel electrode 17R and the common electrode 15R, or the alignment disturbance of the liquid crystal molecules 31R is generated even at the end of the sub-pixel 2R. For this reason, in an outside area 200R surrounded by a two-dot chain line in FIG. 21, the light leakage may be generated in a portion outside both ends (pixel control end) of the pixel electrode 17R.

In a portion surrounded by the round dotted line in the vicinity of the sub-slit 171bR in FIG. 21, the distance from the outside area 200R to the end of the black matrix 22R on the side of the adjacent sub-pixel 2R is particularly small, and a light-shielding amount is small. For this reason, in the portion surrounded by the round dotted line in FIG. 21, a possibility of the oblique-view color mixture is further enhanced.

Although it is conceivable that the black matrix is thickened to shield the light in order to suppress the oblique-view color mixture, the drastic reduction of the transmittance is generated.

The oblique-view color mixture in the case that the black matrix 22R disposed on the side of the CF substrate 20R is fined is described above. On the other hand, in order to secure the aperture ratio and to prevent a crosstalk, the data line 131R that is the light-shielding member is often fined on the side of the TFT substrate 10R included in the liquid crystal display device 1R of the comparative embodiment. In order to electrically stabilize the common electrode 15R to which a constant potential is supplied, sometimes the light-shielding metal line 18R is disposed in a layer contacting directly with the common electrode 15R. In this case, the metal line 18R is often fined for the same reason. In this way, also in the case that the light-shielding member disposed on the side of the TFT substrate is fined, the oblique-view color mixture can be generated for the same reason as the case that the black matrix 22R is fined.

According to JP 2016-142943 A, in the vicinity of the light-shielding region, extension and spreading of a line of electric force are suppressed by the protrusion thread, and the transmittance is reduced due to a decrease in thickness of the liquid crystal layer, so that the oblique-view color mixture can be suppressed to some extent. However, an effect of suppressing the light leakage is insufficient because the protrusion thread is the transparent resin film, and there is still room for improvement in order to suppress the oblique-view color mixture. JP 2015-138267 A is intended to prevent the light leakage generated in the vicinity of the gate electrode, and is not for the purpose of the oblique-view color mixture.

The present invention has been made in view of such a current state of the art and aims to provide a liquid crystal display device capable of suppressing the oblique-view color mixture while suppressing the reduction of the aperture ratio.

As a result of various investigations on the liquid crystal display device capable of suppressing the oblique-view color mixture while suppressing the reduction of the aperture ratio, the inventors have paid attention to a shape of the light-shielding member that is disposed at least between adjacent sub-pixels having different colors in at least one of a first substrate or a second substrate. The inventors have found that in the sub-pixels having different colors on both sides of the light-shielding member, because the sub-slit provided in one of the sub-pixels is located closer to the light-shielding member in a plan view while the sub-slit provided in the other sub-pixel is located farther away from the light-shielding member in a plan view, leakage easiness of the light in the oblique direction varies on both sides of the light-shielding member in the case that the deviation is generated in the bonding of the substrates. The inventors have also found that by widening the light-shielding member on the side on which the light leakage is easily generated and by not widening the light-shielding member on the opposite side, the reduction of the aperture ratio can be suppressed while the oblique light is effectively shielded. Thereby, the inventors have arrived at the solution to the above problem, completing the present invention.

According to one aspect of the present invention, a liquid crystal display device may include: a first substrate; a second substrate opposed to the first substrate; a liquid crystal layer that is sandwiched between the first substrate and the second substrate and includes a liquid crystal molecule; and a plurality of pixels each of which includes a plurality of sub-pixels having a plurality of colors, wherein at least one of the first substrate or the second substrate includes a light-shielding member disposed at least between adjacent sub-pixels having different colors, the first substrate includes a first electrode that is one of a pixel electrode and a common electrode, an interlayer insulating film provided on the first electrode, and a second electrode provided on the interlayer insulating film sequentially toward the liquid crystal layer, the second electrode being the other of the pixel electrode and the common electrode, a slit is provided in each sub-pixel in the second electrode, the slit includes a main slit extending in a first direction and a sub-slit that is connected to an end of the main slit and extends in a second direction, an angle formed between an axial direction with a larger dielectric constant selected from a long axis direction and a short axis direction of the liquid crystal molecule in an initial alignment state and the second direction is larger than an angle formed between the axial direction and the first direction, when the light-shielding member is provided on the first substrate, in a plan view, the light-shielding member is widened on a side of a closer sub-slit among the sub-slits formed in the sub-pixels that have different colors and disposed on both sides of the light-shielding member, and the light-shielding member is not widened on a side of a farther sub-slit, and when the light-shielding member is provided on the second substrate, in a plan view, the light-shielding member is widened on the side of the farther sub-slit among the sub-slits disposed in the sub-pixels that have different colors and disposed on both sides of the light-shielding member, and the light-shielding member is not widened on the side of the closer sub-slit.

The first substrate may include a data line, and the light-shielding member may be the data line.

The first substrate may include a metal line contacting with the common electrode, and the light-shielding member may be the metal line.

The pixel electrode may be the first electrode, and the common electrode may be the second electrode.

The pixel electrode may be the second electrode, and the common electrode may be the first electrode.

The second substrate may include a black matrix that overlaps the light-shielding member in a plan view, and the light-shielding member may be widened in a region where the black matrix is disposed in a plan view.

The second substrate may include a black matrix, and the light-shielding member may be the black matrix.

The present invention can provide the liquid crystal display device capable of suppressing the oblique-view color mixture while suppressing the reduction of the aperture ratio.

DETAILED DESCRIPTION OF THE INVENTION

Figure 1:
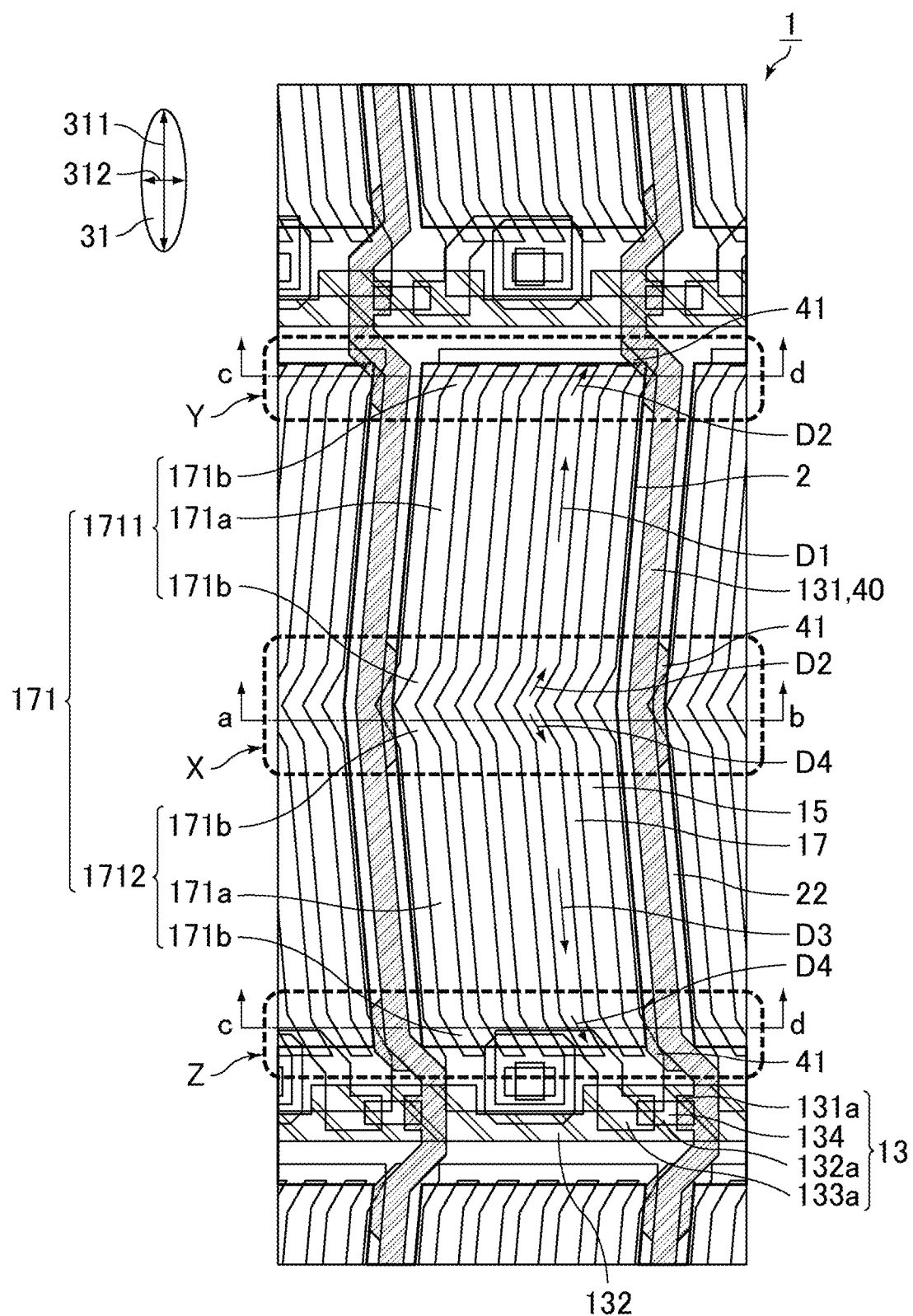
FIG. 1 is a schematic plan view illustrating a liquid crystal display device according to Embodiment 1.

Hereinafter, embodiments of the present invention are described. The embodiments are not intended to limit the scope of the present invention, but appropriate modifications can be made within the spirit of the present invention. In the following description, the same reference numerals are commonly used for the same components or components having the similar function in different drawings, and the repetitive description thereof is omitted. The configurations of the embodiments may appropriately be combined or modified within the spirit of the present invention.

Embodiment 1

Figure 2:
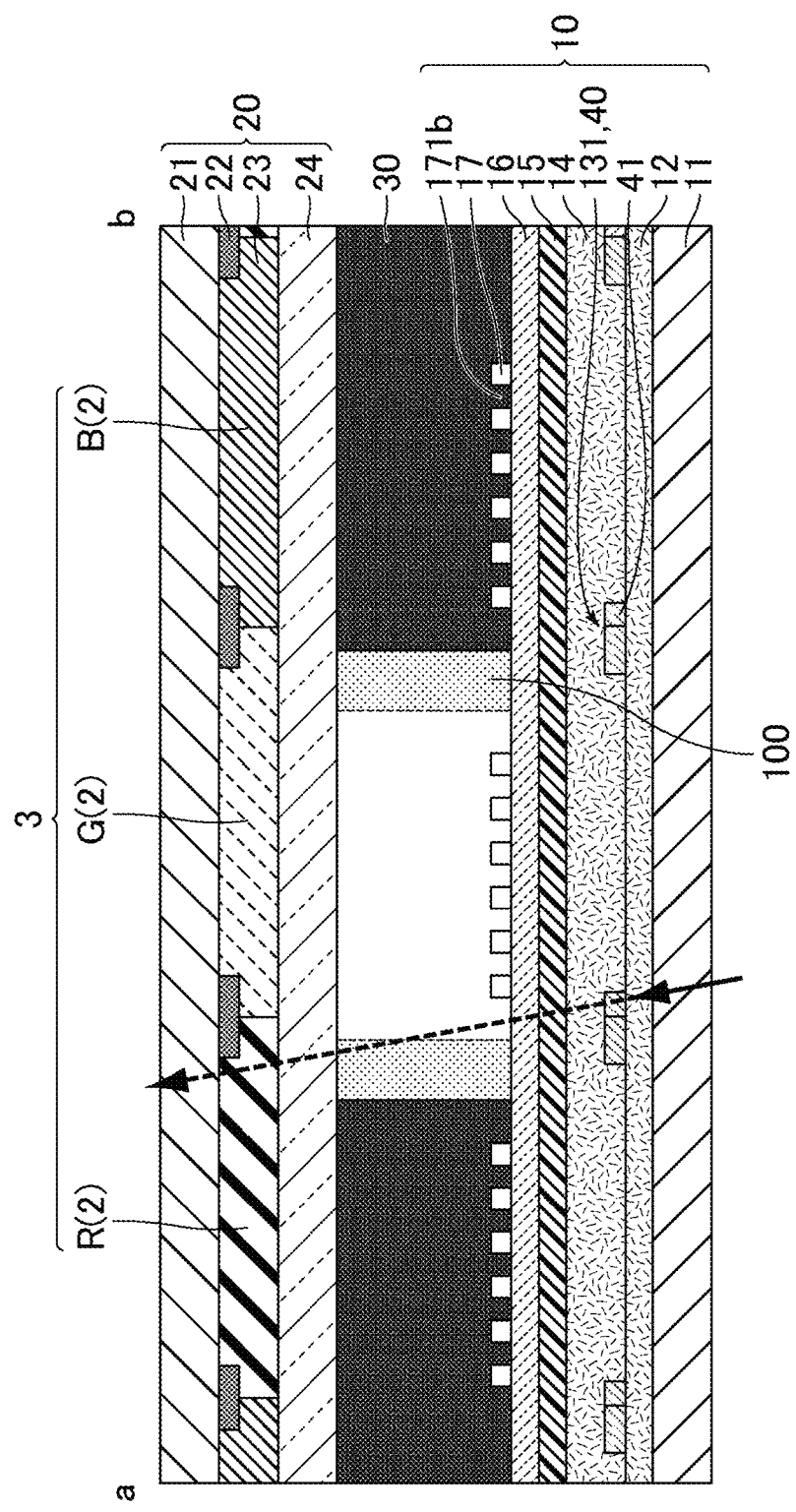
FIG. 2 is a view illustrating the liquid crystal display device of Embodiment 1, and is a schematic cross-sectional view illustrating a central portion of a sub-pixel in the case that a second substrate deviates to a right side in bonding of a first substrate and the second substrate.
Figure 3:
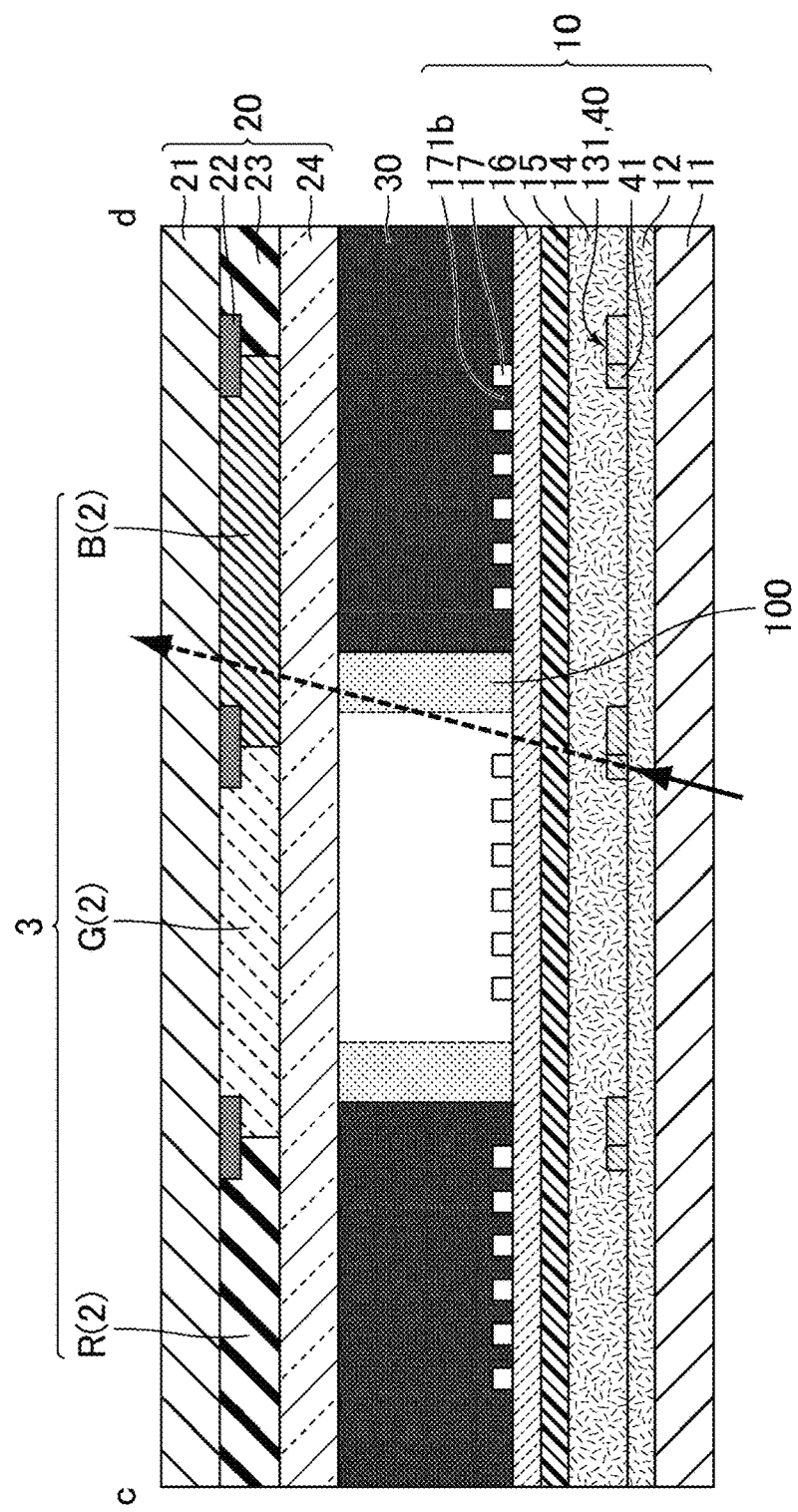
FIG. 3 is a view illustrating the liquid crystal display device of Embodiment 1, and is a schematic cross-sectional view illustrating an upper end and a lower end of the sub-pixel in the case that the second substrate deviates to a left side in the bonding of the first substrate and the second substrate.

In Embodiment 1, the description will be given by taking an FFS mode liquid crystal display device as an example. FIG. 1 is a schematic plan view illustrating a liquid crystal display device according to Embodiment 1. FIG. 2 is a view illustrating the liquid crystal display device of Embodiment 1, and is a schematic cross-sectional view illustrating a central portion of a sub-pixel in the case that a second substrate deviates to a right side in bonding of a first substrate and the second substrate. FIG. 3 is a view illustrating the liquid crystal display device of Embodiment 1, and is a schematic cross-sectional view illustrating an upper end and a lower end of the sub-pixel in the case that the second substrate deviates to a left side in the bonding of the first substrate and the second substrate. FIG. 2 is a schematic cross-sectional view illustrating three sub-pixels along direction a-b in FIG. 1, and is a schematic cross-sectional view illustrating a sub-slit disposed in a central portion X of the sub-pixel. FIG. 3 is a schematic cross-sectional view illustrating three sub-pixels along direction c-d in FIG. 1, and is a schematic cross-sectional view illustrating the sub-slit disposed at an upper end Y and a lower end Z of the sub-pixel.

The liquid crystal display device (liquid crystal panel module) 1 of Embodiment 1 includes a first substrate 10, a second substrate 20 opposed to the first substrate 10, and a liquid crystal layer 30 that is sandwiched between the first substrate 10 and the second substrate 20 and containing liquid crystal molecules 31 (nematic liquid crystals).

The first substrate 10 includes a plurality of data lines (source lines) 131, a plurality of scanning lines 132 intersecting the plurality of data lines 131, and a thin-film transistor (TFT) 13 as a switching element, and is also referred to as a TFT substrate.

The first substrate 10 includes a first insulating substrate 11, a first insulating film 12, the data line 131, a second insulating film 14, a common electrode 15, an interlayer insulating film 16, and a pixel electrode 17 sequentially toward the side of the liquid crystal layer 30. In Embodiment 1, the common electrode 15 is the first electrode, and the pixel electrode 17 is the second electrode. In the description, a voltage applied state in which a voltage is applied between the common electrode and the pixel electrode (between the first electrode and the second electrode) is simply referred to as a "voltage applied state", and a voltage non-applied state in which the voltage is not applied between the common electrode and the pixel electrode (between the first electrode and the second electrode) is simply referred to as a "voltage non-applied state".

A horizontal alignment film (not illustrated) is provided on a surface of the first substrate 10 on the side of the liquid crystal layer 30. On a surface of the first substrate 10 on the side opposite to the liquid crystal layer 30, a first polarizing plate (not illustrated) and a backlight (not illustrated) are provided sequentially from the side of the first substrate 10.

The liquid crystal layer 30 contains the liquid crystal molecules 31 having positive anisotropy of dielectric constant, and a long axis 311 of the liquid crystal molecules 31 in an initial alignment state is set in a vertical direction in FIG. 1 (a perpendicular direction of a panel display surface). In the description, the liquid crystal molecules in the voltage non-applied state are also referred to as liquid crystal molecules in the initial alignment state. For example, the liquid crystal molecule having positive anisotropy of dielectric constant has anisotropy of dielectric constant (Δε) of 2 to 13.

The liquid crystal layer 30 may include liquid crystal molecules 31 having negative anisotropy of dielectric constant instead of the liquid crystal molecules 31 having positive anisotropy of dielectric constant. In this case, the long axis 311 of the liquid crystal molecules 31 in the initial alignment state is set in a crosswise direction in FIG. 1 (a horizontal direction of the panel display surface). For example, the liquid crystal molecule having negative anisotropy of dielectric constant has anisotropy of dielectric constant of −6 to −2.

The anisotropy of dielectric constant is defined by the following formula (L).

$$\Delta\varepsilon = \text{(dielectric constant in the long axis direction of liquid crystal molecules)} - \text{(dielectric constant in the short axis direction of liquid crystal molecules)} \quad (L)$$

The second substrate 20 includes a second insulating substrate 21, a black matrix 22, a color filter (CF) 23, and an overcoat layer 24 sequentially toward the side of the liquid crystal layer 30. The second substrate 20 is also referred to as a CF substrate. The black matrix 22 is a light-shielding member disposed between adjacent sub-pixels 2. A horizontal alignment film (not illustrated) is provided on the surface of the second substrate 20 on the side of the liquid crystal layer 30. A second polarizing plate (not illustrated) is provided on the surface of the second substrate 20 on the side opposite to the liquid crystal layer 30.

In the liquid crystal display device 1, three sub-pixels 2 (a red sub-pixel R, a green sub-pixel G, and a blue sub-pixel B) are disposed in one pixel 3. The case that the green sub-pixel G is in a lighting state (white control) and the red sub-pixel R and the blue sub-pixel B located on both sides of the green sub-pixel G are in a non-lighting state (black control) will be described below by way of example.

The first substrate 10 will be described in detail. The first substrate 10 includes the plurality of data lines 131 extending in the perpendicular direction (the perpendicular direction of the panel display surface) in FIG. 1, the plurality of scanning lines 132 that intersect the plurality of data lines 131 and extend in the horizontal direction (the horizontal direction of the panel display surface) in FIG. 1, and the plurality of TFTs 13. Each of the plurality of data lines 131 is a light-shielding member disposed between adjacent sub-pixels 2.

Each TFT 13 is a three-terminal switch that is electrically connected to a corresponding data line 131 among the plurality of data lines 131 and a corresponding scanning line 132 among the plurality of scanning lines 132, and includes a thin film semiconductor 134, a source electrode 131a constructed with a part of the corresponding data line 131, a gate electrode 132a constructed with a part of the corresponding scanning line 132, and a drain electrode 133a electrically connected to a corresponding pixel electrode 17 among the plurality of pixel electrodes 17.

The pixel electrode 17 in which a plurality of slits (openings) 171 are provided is disposed in each region surrounded by two data lines 131 adjacent to each other and two scanning lines 132 adjacent to each other. The pixel electrode 17 is electrically connected to the data line 131 through a semiconductor 134. A source signal is charged to the pixel electrode 17 by controlling on and off potentials at the scanning line 132, and any pixel potential can be controlled. Consequently, a fringe electric field is generated between the pixel electrode 17 and the common electrode 15 that is disposed below the pixel electrode 17 with the interlayer insulating film 16 interposed therebetween, the liquid crystal molecules 31 are operated, and the light is transmitted in units of sub-pixels segmented into the red sub-pixel R, the green sub-pixel G, and the blue sub-pixel B on the side of the second substrate 20, which allows color display to be performed.

The pixel electrode 17 is provided in each sub-pixel 2, a plurality of slits 171 parallel to each other are provided in each pixel electrode 17, and the common electrode 15 is opposed to the slit 171. The alignment of the liquid crystal molecules 31, more specifically rotation of the liquid crystal molecules 31 is controlled by controlling the voltage applied between the pixel electrode 17 and the common electrode 15.

A structure of the pixel electrode 17 will be described in more detail. The slit 171 includes an upper slit 1711 and a lower slit 1712 that have a line-symmetrical shape with respect to the short axis 312 of the liquid crystal molecule 31 in each sub-pixel 2. The liquid crystal display device 1 of Embodiment 1 is a multi-domain (two-domain) FFS mode liquid crystal display device.

The upper slit 1711 includes a main slit 171a extending in a direction D1 and two sub-slits 171b that are connected to both ends of the main slit 171a extending in the direction D1 and extend in a direction D2. The lower slit 1712 includes a main slit 171a extending in a direction D3 and two sub-slits 171b that are connected to both ends of the main slit 171a extending in the direction D3 and extend in a direction D4. At this point, the directions D1 and D3 correspond to the first direction, and the directions D2 and D4 correspond to the second direction. Each slit 171 has the line-symmetrical shape with respect to a center line between the sub-slit 171b extending in the direction D2 and the sub-slit 171b extending in the direction D4, the sub-slit 171b extending in the direction D2 and the sub-slit 171b extending in the direction D4 being disposed in a central portion of each pixel electrode 17.

An angle formed between an axial direction with the larger dielectric constant selected from the long axis 311 direction and the short axis 312 direction (the long axis 311 direction in the case of positive anisotropy of dielectric constant, the short axis 312 direction in the case of negative anisotropy of dielectric constant) of each liquid crystal molecule 31 in the initial alignment state and the extending directions D2, D4 (second direction) of the sub-slit 171b is larger than an angle formed between the axial direction with the larger dielectric constant and the extending directions D1, D3 (first direction) of the main slit 171a. For this reason, the liquid crystal molecules 31 rotate more easily in a vicinity of the sub-slit 171b than in the vicinity of the main slit 171a, and rotate even with a slight potential difference in the vicinity of the sub-slit 171b.

The angle formed by the axial direction with the larger dielectric constant selected from the long axis 311 direction and the short axis 312 direction of each liquid crystal molecule 31 in the initial alignment state and the extending directions D2, D4 of the sub-slit 171b (hereinafter simply referred to as "angle of sub-slit 171b") ranges preferably from 10° to 50°, and more preferably from 20° to 40°. The angle formed between the axial direction with the larger dielectric constant and the extending directions D1, D3 of the main slit 171a (hereinafter also simply referred to as "angle of main slit 171a") ranges preferably from 1° to 20°, and more preferably from 5° to 15°. The angle of the sub-slit 171b is larger than the angle of the main slit 171a by preferably 10° to 45°, more preferably 15° to 35°.

The angle formed between the direction D1 and the long axis 311 of the liquid crystal molecules 31 in the initial alignment state is equal to the angle formed between the direction D3 and the long axis 311 of the liquid crystal molecules 31 in the initial alignment state. Similarly, the angle formed between the direction D2 and the long axis 311 of the liquid crystal molecules 31 in the initial alignment state is equal to the angle formed between the direction D4 and the long axis 311 of the liquid crystal molecules 31 in the initial alignment state. Each slit 171 has a line-symmetrical shape with respect to the short axis 312 of the liquid crystal molecules 31.

In the liquid crystal display device 1 of Embodiment 1, a slit angle of the main slit 171a is set with a certain inclination such that the liquid crystal molecules 31 initially aligned in the horizontal direction (the crosswise direction on the surface of paper) or perpendicular direction (a longitudinal direction on the surface of paper) determine the direction in which the liquid crystal molecules 31 fall. Because the direction of the fringe electric field becomes a direction (longitudinal direction) that is undesirable for liquid crystal response at the slit end, the sub-slit 171b (first folded portion) having the angle larger than that of the main slit 171aR is formed in order to ensure the stability of the response of the liquid crystal molecules 31. In the central portion of the sub-pixel 2, an upper portion and a lower portion of the sub-pixel 2 are opposite to each other in the moving direction of the liquid crystal molecules 31 with respect to the initial alignment, and a place where the alignments of the liquid crystal molecules 31 collide with each other is generated. In order to ensure the stability of the response of the liquid crystal molecules 31, the sub-slit 171b (second folded portion) having the angle larger than that of the main slit 171a is formed in the central portion similarly to the upper and lower ends of the sub-pixel 2. As described above, the liquid crystal display device 1 of Embodiment 1 has the configuration in which the sub-slit 171b (pixel electrode folded portion) is provided at the central portion, the upper end, and the lower end of the sub-pixel 2.

The centering disposition of the data line 131 on the side of the first substrate 10 with respect to the black matrix 22 on the side of the second substrate 20 disposed at the color boundary is the most efficient configuration from the viewpoint of aperture ratio. At this point, the first folded portion is different from the second folded portion in the direction in which the sub-slit 171bR comes close to the data line 131. The data line 131R located at the boundary of the sub-pixel 2 is closer to the sub-slit 171b on the right side of the sub-slits 171b disposed in the sub-pixels 2 having different colors on both sides in the second folded portion that is the central portion of the sub-pixel, and is closer to the left sub-slit 171b in the first folded portion that is the upper and lower ends of the sub-pixel 2.

In the FFS mode liquid crystal display device 1 in which the fringe electric field is formed between the pixel electrode 17 and the common electrode 15 to obtain the response of the liquid crystal molecules 31, with decreasing distance between the slit 171 provided in the pixel electrode 17 and the data line 131, the edge of the pixel electrode 17 comes closer to the boundary between the sub-pixels 2, and the fringe electric field generated at the edge of the pixel electrode 17 extends easily to the boundary between sub-pixels 2. As described above, because the liquid crystal molecules 31 rotate more easily in the vicinity of the sub-slit 171b than in the vicinity of the main slit 171a, the liquid crystal molecules 31 rotate easily in the vicinity of the sub-slit 171b due to the fringe electric field even in a region 100 outside the sub-pixel 2 (the boundary of the sub-pixels 2) where the light transmission is undesirable, and this phenomenon is easily generated as the distance between the sub-slit 171b and the data line 131 is shorter. The region where the sub-slit 171b is disposed is a region where the alignment of the liquid crystal molecules 31 is easily disturbed, and the vicinity of the sub-slit 171b becomes a region where the alignment of the liquid crystal molecules 31 is hardly controlled even if the sub-slit 171b is provided. Thus, in the vicinity of the sub-slit 171b in the region 100 outside the sub-pixel 2, there is a possibility of the light transmission due to unexpected alignment of the liquid crystal molecules 31. For this reason, for example, a concern about oblique-view color mixture is enhanced in the vicinity of the sub-slit 171b in the case that a sub-pixel is controlled in white (total transmission) while a sub-pixel adjacent to the sub-pixel is in the black (not transmitted), and the concern of the oblique-view color mixture is further enhanced in the case that the bonding of the second substrate (the position of the black matrix) deviates to the side of the white sub-pixel.

In Embodiment 1, the central portion and the upper and lower ends of the sub-pixel 2 are opposite to each other in the direction in which the sub-slit 171b comes closer to the data line 131, so that the central portion and the upper and lower ends of the sub-pixel 2 are opposite to each other in the situation in which the concern about the oblique-view color mixture is further enhanced. For example, the concern about the generation of the oblique-view color mixture in the central portion of the sub-pixel 2 is further enhanced as illustrated in FIG. 2 in the case that the second substrate 20 deviates to the right side, and the concern about the generation of the oblique-view color mixture at the upper and lower ends of the sub-pixel 2 is further enhanced as illustrated in FIG. 3 in the case that the second substrate 20 deviates to the left side.

In Embodiment 1, in order to solve these problems, attention is paid to the data line 131 as the light-shielding member 40 disposed between the sub-pixels 2 having different colors, and the data line 131 is widened only in the direction in which the concern of the generation of the oblique-view color mixture is enhanced, and an additional light-shielding unit 41 is disposed. More specifically, the data line 131 that is the light-shielding member 40 provided on the first substrate 10 is widened on the side of the closer sub-slit 171b in the sub-slits 171b disposed in the sub-pixels 2 having different colors on both sides of the data line 131. Consequently, the light-shielding member 40 is widened on the side on which the light in the oblique direction leaks more easily when a deviation of the bonding of the substrate is generated, and the light in the oblique direction can be shielded by the first substrate 10 to suppress the oblique-view color mixture. The data line 131 is not widened on the side of the farther sub-slit 171b in the sub-slits 171b disposed in the sub-pixels 2 having different colors on both sides of the data line 131, so that the reduction of the aperture ratio can be suppressed as compared with the case that the data line 131 is widened on both sides. As a result, as compared with the case that the data line 131 that is the light-shielding member 40 is widened to both the sides, the oblique-view color mixture can be suppressed while the reduction of the aperture ratio is suppressed. Particularly, in Embodiment 1 in which the slit 171 is provided in the pixel electrode 17, because the edge of the pixel electrode 17 is disposed outside the slit 171, the fringe electric field spreads easily to the outside of the sub-pixel 2 and the oblique-view color mixture is generated easily as compared with the aspect in which the common electrode including the slit is disposed on the pixel electrode (Embodiments 7 and 8), but the oblique-view color mixture can effectively be suppressed by widening the data line 131 as described above.

In JP 2016-142943 A, smoothness at a liquid crystal interface is degraded due to the protrusion thread, which results occasionally in the generation of the defects such as poor alignment. On the other hand, in Embodiment 1, the protrusion thread is not provided unlike JP 2016-142943 A, so that the oblique-view color mixture can be suppressed while the generation of the poor alignment is suppressed.

The data line 131 may be widened on the side of the closer sub-slit 171b in the sub-slits 171b disposed in the sub-pixels 2 having different colors on both sides of the data line 131 in a plan view. Although an extent to which the data line 131 is widened is not particularly limited, the data line 131 is preferably widened by, for example, 1 μm to 5 μm in the region where the overlapping black matrix 22 is disposed (that is, the width of the additional light-shielding unit 41 is set to 1 μm to 5 μm) from the viewpoint of suppressing the reduction of the aperture ratio.

The distance between the main slit 171a adjacent to the light-shielding member 40 and the light-shielding member 40 is kept constant in a portion in which the light-shielding member 40 (data line 131) including the additional light-shielding unit 41 is not widened, and the distance between the slit 171 adjacent to the light-shielding member 40 and the data line 131 is decreased in a portion in which the light-shielding member 40 is widened. That is, it is assumed that the light-shielding member 40 is widened in the portion in which the distance between the slit 171 adjacent to the light-shielding member 40 and the data line 131 is smaller than the distance between the main slit 171a adjacent to the light-shielding member 40 and the light-shielding member 40, and it is assumed that the light-shielding member 40 is not widened in the portion in which the distance between the slit 171 adjacent to the light-shielding member 40 and the data line 131 is equal to (including substantially equal to) or larger than the distance between the main slit 171a adjacent to the light-shielding member 40 and the light-shielding member 40.

The region where the data line 131 is widened may be at least a part of the region where the closer sub-slit 171b is projected onto the data line 131 in the extending direction of the scanning line 132. For example, the region where the data line 131 is widened may be a part of the projected region, the whole projected region, or a wider region including the whole projected region.

The structure of the light-shielding member 40 that is the main feature of Embodiment 1 is described above. Other structures, a material of each member, and a manufacturing method will be described below.

A common signal kept at a constant is supplied to the common electrode 15. Regardless of a boundary of the sub-pixel, the common electrode 15 is formed over the almost entire surface except for a specific portion such as a connection unit between the pixel electrode 17 and the drain electrode 133a.

A transparent material such as glass or plastic is preferably used as the material for the first insulating substrate 11 and the second insulating substrate 21.

For example, the first insulating film 12 and the interlayer insulating film 16 are an inorganic insulating film. For example, the second insulating film 14 is an organic insulating film or a laminate of an organic insulating film and an inorganic insulating film. Examples of the material for the inorganic insulating film include silicon nitride and silicon oxide. An example of the material for the organic insulating film includes transparent resin such as a photosensitive acrylic resin.

For example, a single layer or a plurality of layers made of metal such as copper, titanium, aluminum, molybdenum, and tungsten or an alloy thereof are deposited by a sputtering method, and patterning is performed by a photolithography method, which allows the formation of various lines and electrodes constituting the data line 131, the scanning line 132, and the TFT 13. Those lines and electrodes formed in the same layer are formed using the same material to improve manufacturing efficiency.

For example, the semiconductor 134 of the TFT 13 is constructed with a high-resistance semiconductor layer made of amorphous silicon or polysilicon and a low-resistance semiconductor layer made of n+ amorphous silicon in which an impurity such as phosphorus is doped in amorphous silicon. An oxide semiconductor layer such as zinc oxide may be used as the semiconductor 134.

For example, a single layer or a plurality of layers made of a transparent conductive material such as indium tin oxide (ITO), indium zinc oxide (IZO), zinc oxide (ZnO), and tin oxide (SnO) or an alloy thereof are deposited by a sputtering method, and the patterning is performed by a photolithography method, which allows the formation of the pixel electrode 17 and the common electrode 15. The slit 171 provided in the pixel electrode 17 can also be formed at the same time during patterning.

The material for the black matrix 22 is not particularly limited as long as the material has light-shielding, but a resin material containing black pigments or a metal material having the light-shielding is suitably used. For example, the black matrix 22 is formed by a photolithography method, in which a film is formed by applying a photosensitive resin containing black pigments and exposure and development are performed.

A photosensitive resin (color resist) that transmits light corresponding to each color is suitably used as the material for a color filter 23. For example, the color filter 23 is formed by a photolithography method, in which a film is formed by applying a photosensitive resin and exposure and development are performed.

The overcoat layer 24 flattens the surface of the second substrate 20 on the side of the liquid crystal layer 30. For example, an organic film having dielectric constant ε of 3 to 4 can be used as the overcoat layer 24. For example, the overcoat layer 24 is formed by application of a photosetting resin, irradiation with ultraviolet light, and baking.

Both of the first polarizing plate and the second polarizing plate are an absorptive polarizer, and have a crossed Nicols arrangement relationship in which absorption axes are orthogonal to each other.

A type of the backlight is not particularly limited. For example, an edge light type and a direct under type can be cited. The type of the light source of the backlight is not particularly limited. For example, a light emitting diode (LED) and a cold cathode fluorescent lamp (CCFL) can be cited.

In the liquid crystal display device 1 of Embodiment 1, the first substrate 10 further includes a source driver (not illustrated) electrically connected to the plurality of data lines 131 and a gate driver (not illustrated) electrically connected to the plurality of scanning lines 132 (not illustrated). The gate driver sequentially supplies a scanning signal to the scanning line 132 under the control of a controller (not illustrated). The source driver supplies a data signal to the data line 131 under the control of the controller in timing of putting the TFT 13 into the voltage applied state by the scanning signal. The pixel electrode 17 is set to a potential corresponding to the data signal supplied through the corresponding TFT 13, the fringe electric field is generated between the pixel electrode 17 and the common electrode 15, and the liquid crystal molecules of the liquid crystal layer 30 rotate. In this way, magnitude of the voltage applied between the pixel electrode 17 and the common electrode 15 is controlled, and retardation of the liquid crystal layer 30 is changed to control the transmission and non-transmission of the light.

The liquid crystal display device 1 includes a flexible printed circuit (FPC) electrically connected to the first substrate 10. The FPC is a flexible printed circuit board, and electrically connects the first substrate 10 and a control circuit board (not illustrated) of an external device (host) serving as a signal supply source.

The definition of the liquid crystal display device 1 is not particularly limited. However, the oblique-view color mixture can be suppressed even when the black matrix 22 is fined with the high definition, so that the liquid crystal display device 1 is suitably applied to the use in which the high definition (for example, 100 ppi to 1000 ppi) is required. The definition (ppi: pixel per inch) in the description is a number of pixels disposed per inch (2.54 cm).

Figure 4:
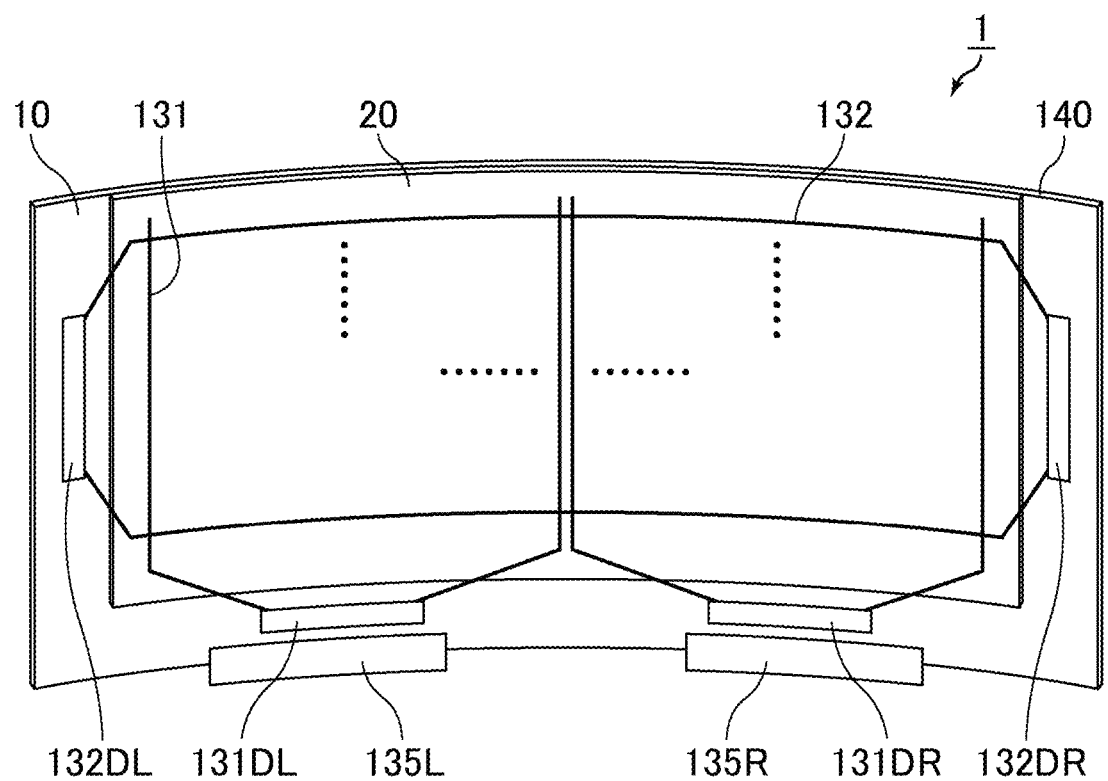
FIG. 4 is a schematic view illustrating the case that the liquid crystal display device of Embodiment 1 is applied to a curved display.

FIG. 4 is a schematic view illustrating the case that the liquid crystal display device of Embodiment 1 is applied to a curved display. As illustrated in FIG. 4, the liquid crystal display device 1 of Embodiment 1 can also suitably be used in the curved display in which the first substrate 10 and the second substrate 20 are curved and deformed. In the curved display in which the display surface is curved, although the first substrate 10 and the second substrate 20 are curved and deformed, a difference in curvature radius is generated between the two substrates 10 and 20. Thus, a possibility that a relative position between a sub-pixel structure disposed on the first substrate 10 and a sub-pixel structure disposed on the second substrate 20 deviates in a curved direction to generate the oblique-view color mixture is higher than that of a normal flat display. However, in the liquid crystal display device 1 of Embodiment 1, the data line 131 that is the light-shielding member 40 is widened onto a specific side, so that the oblique-view color mixture can be suppressed even if the deviation is generated between the first substrate 10 and the second substrate 20. Consequently, the liquid crystal display device 1 of Embodiment 1 can also suitably be used in the curved display.

In the case that the liquid crystal display device 1 of Embodiment 1 is applied to the curved display, as illustrated in FIG. 4, the liquid crystal display device 1 of Embodiment 1 includes two FPCs 135L and 135R, the FPC 135L is electrically connected to the left side at the lower end of the first substrate 10, and the FPC 135R is electrically connected to the right side at the lower end of the first substrate 10.

Two source drivers 131DL and 131DR are mounted on the first substrate 10, the source driver 131DL is provided on the left side at the lower end of the first substrate 10, the source driver 131DR is provided on the right side at the lower end of the first substrate 10. The source driver 131DL is electrically connected to the plurality of data lines 131 disposed on a left half of the first substrate 10, and the source driver 131DR is electrically connected to a plurality of data lines 131 disposed on a right half of the first substrate 10.

Two gate drivers 132DL and 132DR are mounted on the first substrate 10, the gate driver 132DL is provided at the left end of the first substrate 10, and the gate driver 132DR is provided at the right end of the first substrate 10.

Embodiment 2

Features unique to Embodiment 2 will mainly be described, and the description of contents overlapping Embodiment 1 will be omitted. In Embodiment 1, the data line 131 provided on the first substrate 10 is used as the light-shielding member 40. On the other hand, in Embodiment 2, attention is paid to a black matrix 22 as a light-shielding member 40 disposed between sub-pixels 2 having different colors, and a black matrix on a second substrate side is widened to dispose an additional light-shielding unit in order to obtain the same quality level as that of Embodiment 1 with respect to the oblique-view color mixture, whereby the oblique light is shielded. The black matrix 22 is also disposed between sub-pixels 2 having the same color.

Figure 5:
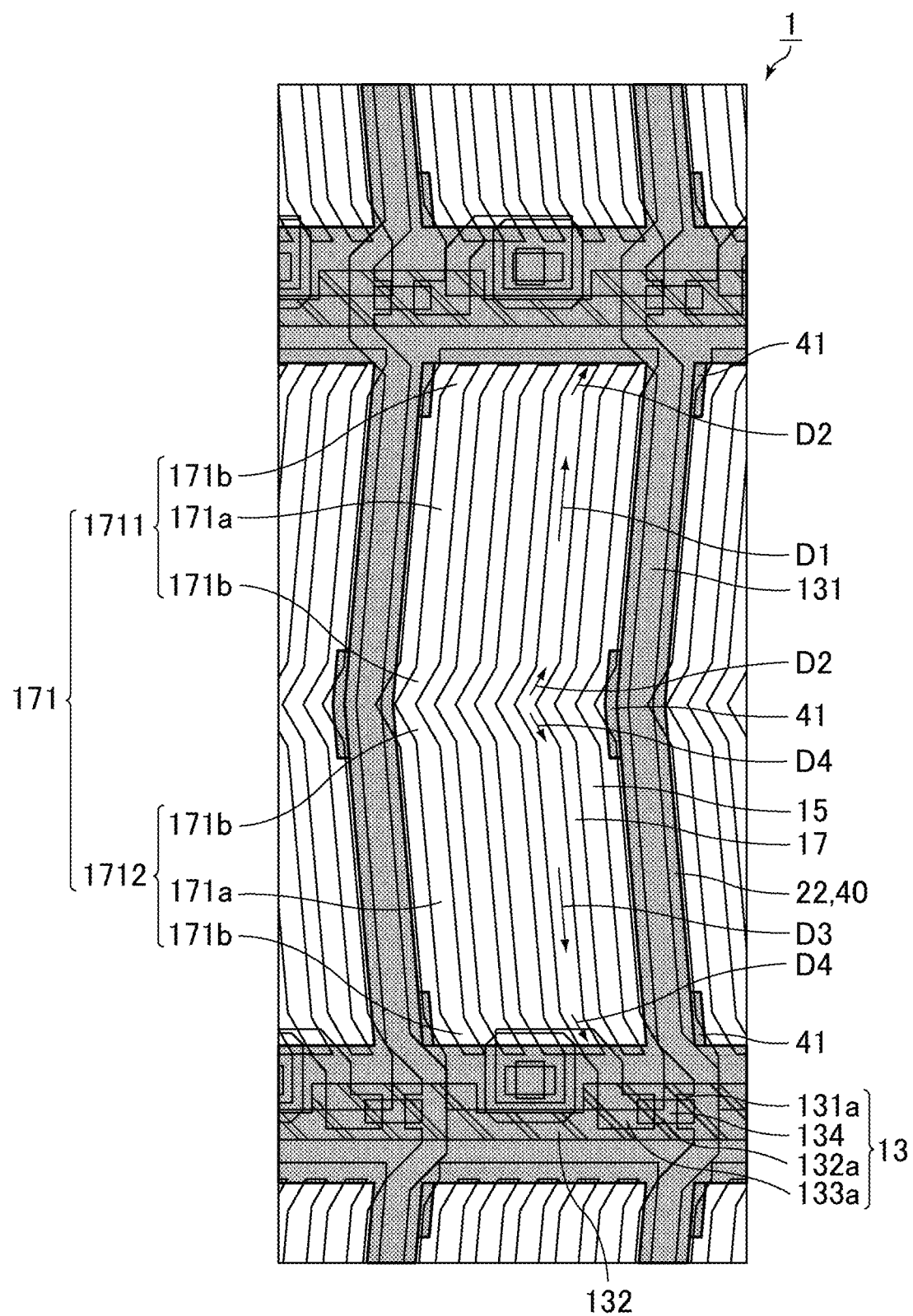
FIG. 5 is a schematic plan view illustrating a liquid crystal display device according to Embodiment 2.

FIG. 5 is a schematic plan view illustrating a liquid crystal display device according to Embodiment 2. The oblique light that causes the oblique-view color mixture travels from the side of a first substrate 10 of one of the adjacent sub-pixels 2 having different colors to the side of a second substrate 20 of the other sub-pixel 2. For this reason, based on the boundary of the adjacent sub-pixels 2 having different colors, the position through which the oblique light passes on the second substrate 20 is opposite to the position through which the oblique light passes on the first substrate 10. Thus, in Embodiment 2 in which the additional light-shielding unit 41 is provided on the second substrate 20, the light-shielding member 40 is widened on the side opposite to Embodiment 1 in which the additional light-shielding unit 41 is provided on the first substrate 10. That is, in Embodiment 2, the black matrix 22 provided on the second substrate 20 is used as the light-shielding member 40 including the additional light-shielding unit 41, and the black matrix 22 that is the light-shielding member 40 is widened on the side of a farther sub-slit 171*b* in sub-slits 171*b* disposed in the sub-pixels 2 having different colors on both sides of the black matrix 22 in a plan view. Consequently, the light-shielding member 40 is widened on the side on which the light in the oblique direction leaks more easily when the deviation of bonding of the substrate is generated, and the light in the oblique direction can be shielded by the second substrate 20 to suppress the oblique-view color mixture.

The black matrix 22 is not widened on the side of the closer sub-slit 171*b* in the sub-slits 171*b* disposed in the sub-pixels 2 having different colors on both sides of the black matrix 22, so that the reduction of the aperture ratio can be suppressed as compared with the case that the black matrix 22 is widened on both sides. As described above, in Embodiment 2, as compared with the case that the black matrix 22 that is the light-shielding member 40 is widened onto both the sides, the oblique-view color mixture can also be suppressed while the reduction of the aperture ratio is suppressed, and the display quality can be secured.

As illustrated in FIG. 1, in Embodiment 1, because most of the additional light-shielding unit 41 provided on the first substrate 10 is disposed at a position overlapping the black matrix 22 provided on the second substrate 20, the reduction of the aperture ratio due to the disposition of the additional light-shielding unit 41 is small. On the other hand, in Embodiment 2, as illustrated in FIG. 5, because the additional light-shielding unit 41 is formed using the black matrix 22, the aperture ratio is reduced as compared with Embodiment 1.

The black matrix 22 may be widened on the side of the farther sub-slit 171*b* in the sub-slits 171*b* disposed in the sub-pixels 2 having different colors on both sides of the black matrix 22 in a plan view. Although an extent to which the black matrix 22 is widened is not particularly limited, the black matrix 22 is preferably widened by, for example, 1 μm to 5 μm (that is, the width of the additional light-shielding unit 41 is set to 1 μm to 5 μm) in consideration of the deviation between the substrates.

The region where the black matrix 22 is widened may be at least a part of the region where the farther sub-slit 171*b* is projected onto the black matrix 22 in the extending direction of the scanning line 132. For example, the region where the black matrix 22 is widened may be a part of the projected region, the whole projected region, or a wider region including the whole projected region.

Embodiment 3

Features unique to Embodiment 3 will mainly be described, and the description of contents overlapping Embodiments 1 and 2 will be omitted. The configuration in which two alignment directions in one sub-pixel 2 compensate for the viewing angle is illustrated in Embodiment 1. A configuration in which one pixel has an angle of the main slit in one direction while two longitudinal sub-pixel units have two alignment directions is illustrated in Embodiment 3.

Figure 6:
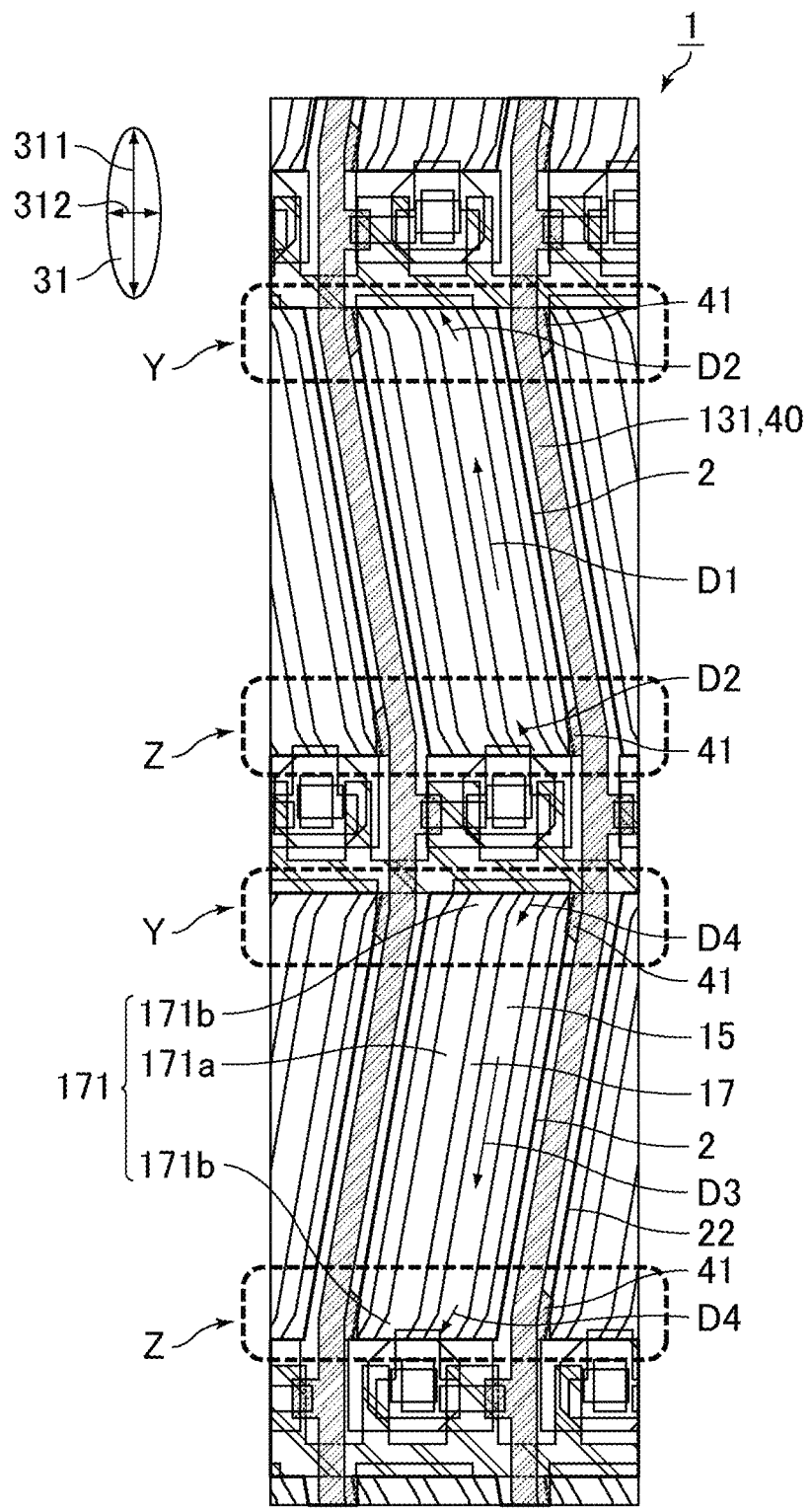
FIG. 6 is a schematic plan view illustrating a liquid crystal display device according to Embodiment 3.

FIG. 6 is a schematic plan view illustrating a liquid crystal display device according to Embodiment 3. In Embodiment 3, a slit 171 including a main slit 171*a* extending in a direction D1 and two sub-slits 171*b* that are connected to both ends of the main slit 171*a* extending in the direction D1 and extend in a direction D2 is provided in a pixel electrode 17 disposed in one of two longitudinally-arrayed sub-pixels 2, and a slit 171 including a main slit 171*a* extending in a direction D3 and two sub-slits 171*b* that are connected to both ends of the main slit 171*a* extending in the direction D3 and extend in a direction D4 is provided in a pixel electrode 17 disposed in the other sub-pixel 2. The angle formed between the direction D1 and the long axis 311 of the liquid crystal molecules 31 in the initial alignment state is equal to the angle formed between the direction D3 and the long axis 311 of the liquid crystal molecules 31 in the initial alignment state. Similarly, the angle formed between the direction D2 and the long axis 311 of the liquid crystal molecules 31 in the initial alignment state is equal to the angle formed between the direction D4 and the long axis 311 of the liquid crystal molecules 31 in the initial alignment state. The slits 171 disposed in two longitudinally-arrayed sub-pixels 2 have a line-symmetrical shape with respect to the boundary line between the two sub-pixels 2. The slits 171 disposed in two longitudinally-arrayed sub-pixels 2 have a line-symmetrical shape with respect to a short axis 312 of liquid crystal molecules 31. At this point, the directions D1 and D3 correspond to the first direction, and the directions D2 and D4 correspond to the second direction.

In Embodiment 3, as described above, for the purpose of alignment stabilization of the liquid crystal molecules 31, the sub-slit 171*b* in which the angle is tilted more than the main slit 171*a* is provided at an upper end Y and a lower end Z of the sub-pixel. Similarly to Embodiment 1, a data line 131 that is a light-shielding member 40 provided on a first substrate 10 is widened on the side of the closer sub-slit 171*b* in the sub-slits 171*b* disposed in the sub-pixels 2 having different colors on both sides of the data line 131. Consequently, the light-shielding member 40 is widened on the side on which the light in the oblique direction leaks more easily when a deviation of the bonding of the substrate is generated, and the light in the oblique direction can be shielded by the first substrate 10 to suppress the oblique-view color mixture. The data line 131 is not widened on the side of the farther sub-slit 171*b* in the sub-slits 171*b* disposed in the sub-pixels 2 having different colors on both sides of the data line 131, so that the reduction of the aperture ratio can be suppressed as compared with the case that the data line 131 is widened on both sides. Thus, in Embodiment 3, as compared with the case that the data line 131 that is the light-shielding member 40 is widened to both the sides, the oblique-view color mixture can be suppressed while the reduction of the aperture ratio is suppressed, and the display quality can be secured.

In Embodiment 3, in order to solve the same problem as Embodiment 1, an additional light-shielding unit 41 is disposed in the data line 131 so as to be able to follow the direction in which the light is transmitted from the oblique view. The position of the additional light-shielding unit 41 of Embodiment 3 is provided diagonally when viewed with one sub-pixel 2.

Embodiment 4

Features unique to Embodiment 4 will mainly be described, and the description of contents overlapping Embodiments 1 to 3 will be omitted. In Embodiment 3, the data line 131 provided on the first substrate 10 is used as the light-shielding member 40 including the additional light-shielding unit 41. On the other hand, in Embodiment 4, a black matrix on a second substrate side is widened to dispose an additional light-shielding unit 41 in order to obtain the same quality level as that of Embodiment 3 with respect to the oblique-view color mixture, whereby the oblique light is shielded.

Figure 7:
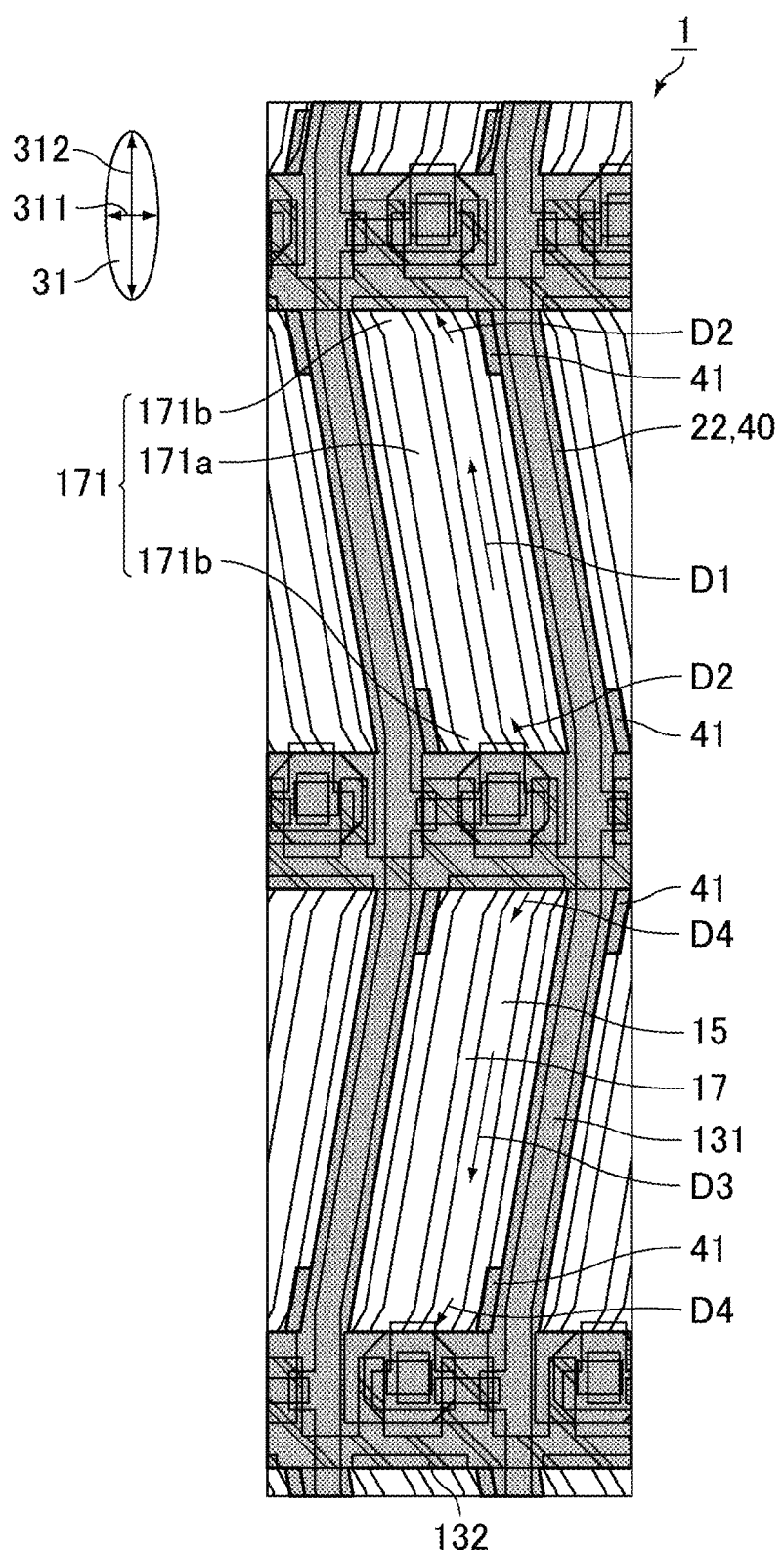
FIG. 7 is a schematic plan view illustrating a liquid crystal display device according to Embodiment 4.

FIG. 7 is a schematic plan view illustrating a liquid crystal display device according to Embodiment 4. In Embodiment 4, a black matrix 22 provided on a second substrate 20 is used as a light-shielding member 40 including the additional light-shielding unit 41. The black matrix 22 that is the light-shielding member 40 is widened on the side of a farther sub-slit 171*b* in sub-slits 171*b* disposed in sub-pixels 2 having different colors on both sides of the black matrix 22 in a plan view. Consequently, the light-shielding member 40 is widened on the side on which the light in the oblique direction leaks more easily when the deviation of bonding of the substrate is generated, and the light in the oblique direction can be shielded by the second substrate 20 to suppress the oblique-view color mixture. The black matrix 22 is not widened on the side of the closer sub-slit 171*b* in the sub-slits 171*b* disposed in the sub-pixels 2 having different colors on both sides of the black matrix 22, so that the reduction of the aperture ratio can be suppressed as compared with the case that the black matrix 22 is widened on both sides. As described above, in Embodiment 4, as compared with the case that the black matrix 22 that is the light-shielding member 40 is widened onto both the sides, the oblique-view color mixture can also be suppressed while the reduction of the aperture ratio is suppressed, and the display quality can be secured.

As illustrated in FIG. 6, in Embodiment 3, because most of the additional light-shielding unit 41 provided on the first substrate 10 is disposed at a position overlapping the black matrix 22 provided on the second substrate 20, the reduction of the aperture ratio due to the disposition of the additional light-shielding unit 41 is small. On the other hand, in Embodiment 4, as illustrated in FIG. 7, because the additional light-shielding unit 41 is formed using the black matrix 22, the aperture ratio is reduced as compared with Embodiment 3.

Embodiment 5

Features unique to Embodiment 5 will mainly be described, and the description of contents overlapping Embodiments 1 to 4 will be omitted. In Embodiment 3, the data line 131 is used as the light-shielding member 40 including the additional light-shielding unit 41. On the other hand, in Embodiment 5, another metal line is used as a light-shielding member 40.

Figure 8:
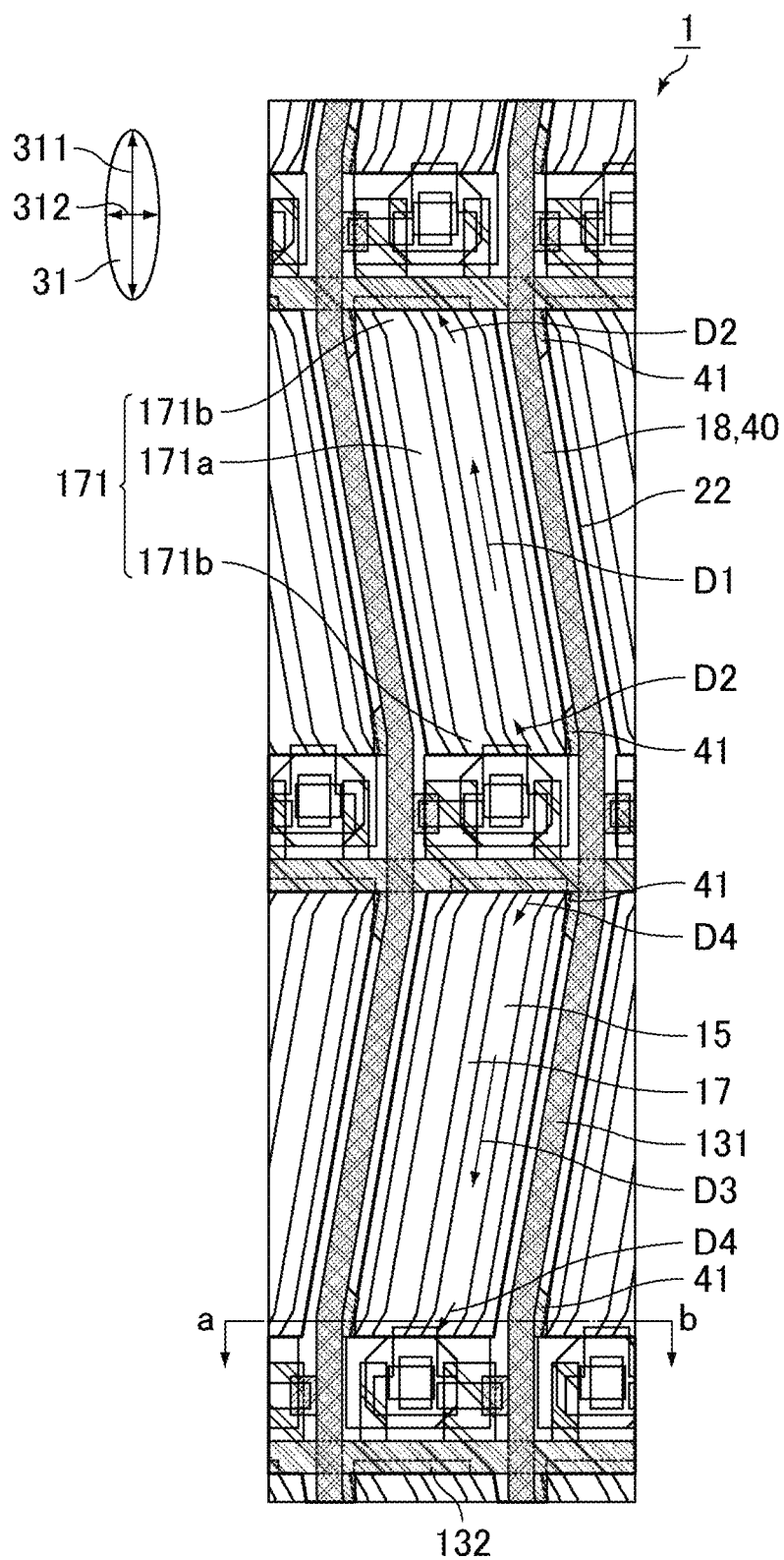
FIG. 8 is a schematic plan view illustrating a liquid crystal display device according to Embodiment 5.
Figure 9:
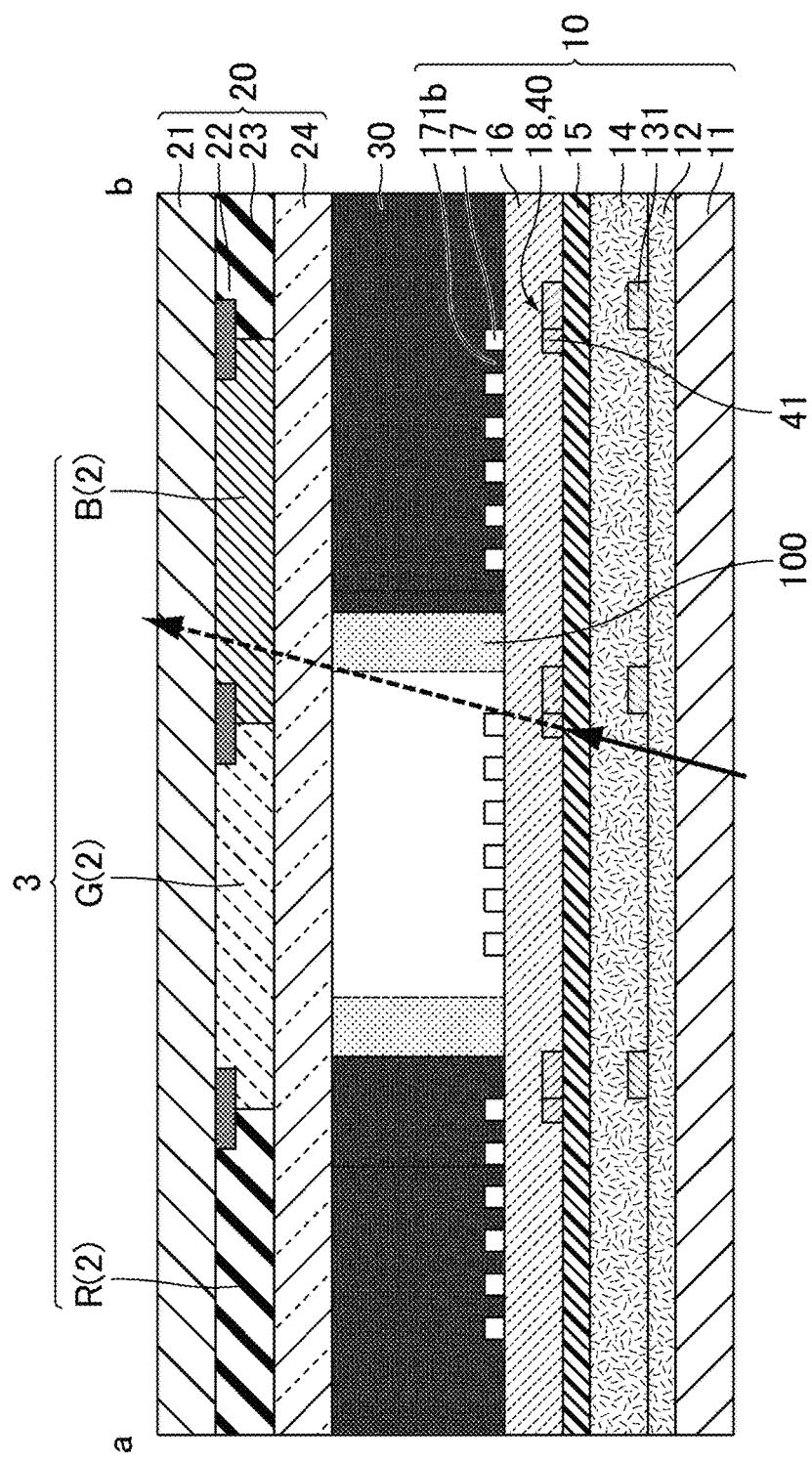
FIG. 9 is a schematic cross-sectional view illustrating the liquid crystal display device of Embodiment 5.

FIG. 8 is a schematic plan view illustrating a liquid crystal display device according to Embodiment 5. FIG. 9 is a schematic cross-sectional view illustrating the liquid crystal display device of Embodiment 5. FIG. 9 is a schematic cross-sectional view illustrating three sub-pixels along direction a-b in FIG. 8, and is a schematic cross-sectional view illustrating a sub-slit disposed in a central portion of the sub-pixel.

A liquid crystal display device 1 of Embodiment 5 includes the same FFS configuration pixel as the liquid crystal display device 1 of Embodiment 3, but has the configuration in which a metal line (also referred to as a third metal line) 18 is added to in a layer contacting with a common electrode 15 that is a transparent electrode. In the pixel having the FFS configuration, the common electrode serving as the reference electrode is formed on the TFT substrate side, and is typically constructed with the transparent electrode such as ITO in order to secure the transmittance of the pixel opening. The transparent conductive film generally has a high resistance, and a charging time to a normal potential is lengthened to occasionally degrade the display quality in the case that a reference potential is disturbed due to an amplitude of the source signal or the like. In order to electrically stabilize the common electrode to which a constant potential is supplied, a charging ability is enhanced by the third metal line that is a low-resistance metal line. At this point, preferably the aperture ratio is not reduced by disposing the third metal line in a portion except for the opening. FIGS. 8 and 9 illustrate the configuration in which the metal line 18 is disposed at a position (overlapping position) corresponding to a data line 131 and a scanning line 132. That is, the metal line 18 is disposed between sub-pixels 2 having different colors and between sub-pixels 2 having the same color.

In Embodiment 5, similarly to Embodiment 3, the concern about the oblique-view color mixture is enhanced at a sub-slit 171*b*. For this reason, in Embodiment 5, an additional light-shielding unit 41 is also disposed using the metal line 18 similarly to Embodiment 3.

In Embodiment 5, the metal line 18 that is the light-shielding member 40 provided on a first substrate 10 is widened on the side of the closer sub-slit 171*b* in the sub-slits 171*b* disposed in the sub-pixels 2 having different colors on both sides of the data line 131. Consequently, the light-shielding member 40 is widened on the side on which the light in the oblique direction leaks more easily when a deviation of the bonding of the substrate is generated, and the light in the oblique direction can be shielded by the first substrate 10 to suppress the oblique-view color mixture. The metal line 18 is not widened on the side of the farther sub-slit 171*b* in the sub-slits 171*b* disposed in the sub-pixels 2 having different colors on both sides of the data line 131, so that the reduction of the aperture ratio can be suppressed as compared with the case that the metal line 18 is widened on both sides. Thus, in Embodiment 5, as compared with the case that the metal line 18 that is the light-shielding member 40 is widened to both the sides, the oblique-view color mixture can be suppressed while the reduction of the aperture ratio is suppressed, and the display quality can be secured.

In Embodiment 5, in order to solve the same problem as Embodiment 3, the additional light-shielding unit 41 is disposed in the metal line 18 so as to be able to follow the direction in which the light is transmitted from the oblique view. The position of the additional light-shielding unit 41 of Embodiment 5 is provided diagonally when viewed with one sub-pixel 2.

Figure 10:
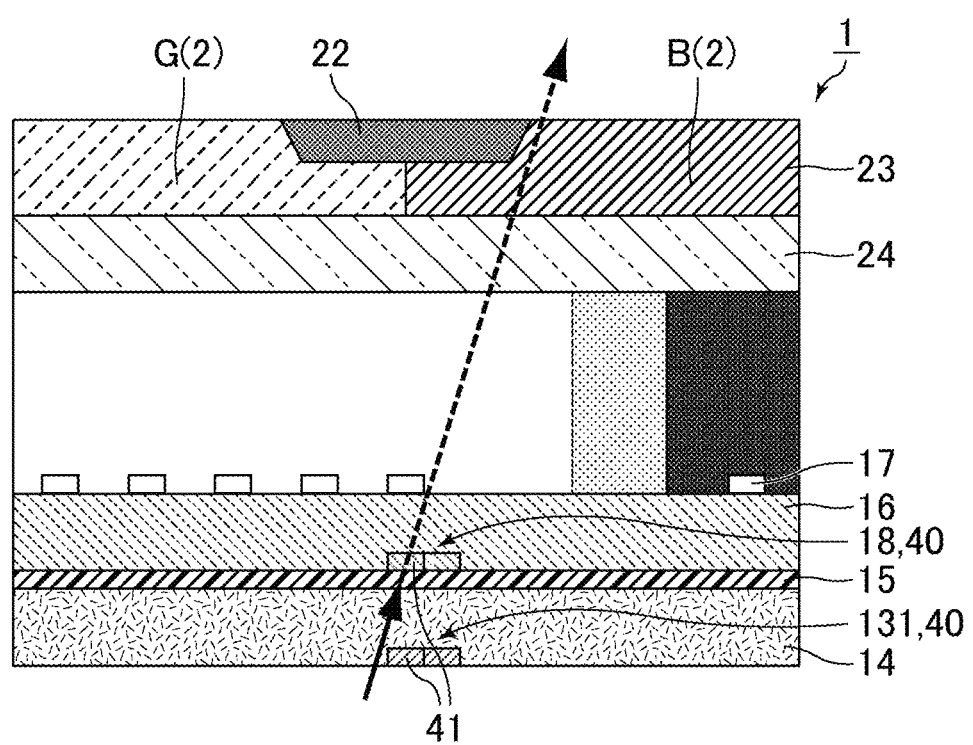
FIG. 10 is a schematic cross-sectional view illustrating light shielding in an oblique direction in the liquid crystal display devices of Embodiments 3 and 5.

FIG. 10 is a schematic cross-sectional view illustrating light shielding in an oblique direction in the liquid crystal display devices of Embodiments 3 and 5. FIG. 10 is a schematic enlarged view illustrating a section taken along direction a-b in FIG. 8.

FIG. 10 illustrates two types of additional light-shielding units 41 in a single figure in order to compare the light-shielding situation of the oblique-view color mixture in the case that the light is shielded by the data line 131 and the case that the light is shielded by the metal line 18. As illustrated in FIG. 10, the effect of shielding the light from the same angle is higher in the case that the light is shielded on the side close to the liquid crystal layer 30. Thus, in Embodiment 5 in which the light is shielded by the metal line 18 close to the liquid crystal layer 30, a light-shielding width can be reduced to further narrow the width of the additional light-shielding unit 41 as compared with Embodiment 3. Consequently, the oblique-view color mixture is suppressed while the reduction of the aperture ratio is suppressed, and the display quality can be secured.

In the case that the light is shielded by the data line 131, a parasitic capacitance, such as a capacitance between the data line 131 and the common electrode 15, which is undesirable to secure the pixel display quality, is generated by partially widening the data line 131, and a possibility of degradation of the display quality such as the crosstalk arises. However, the concern about the degradation of the display quality is not generated in the light-shielding by the metal line 18 as in Embodiment 5.

The metal line 18 may be widened on the side of the closer sub-slit 171*b* in the sub-slits 171*b* disposed in the sub-pixels 2 having different colors on both sides of the metal line 18 in a plan view. Although an extent to which the metal line 18 is widened is not particularly limited, the metal line 18 is preferably widened by, for example, 1 µm to 5 µm in the region where the overlapping black matrix 22 is disposed (that is, the width of the additional light-shielding unit 41 is set to 1 µm to 5 µm) from the viewpoint of suppressing the reduction of the aperture ratio.

The region where the metal line 18 is widened may be at least a part of the region where the closer sub-slit 171*b* is projected onto the metal line 18 in the extending direction of the scanning line 132. For example, the region where the metal line 18 is widened may be a part of the projected region, the whole projected region, or a wider region including the whole projected region.

For example, a single layer or a plurality of layers made of metal such as copper, titanium, aluminum, molybdenum, and tungsten or an alloy thereof are deposited by a sputtering method, and patterning is performed by a photolithography method, which allows the formation of the metal line 18.

Embodiment 6

Features unique to Embodiment 6 will mainly be described, and the description of contents overlapping Embodiments 1 to 5 will be omitted. In Embodiment 5, the metal line 18 provided on the first substrate 10 is used as the light-shielding member 40 including the additional light-shielding unit 41. On the other hand, in Embodiment 6, a black matrix on a second substrate side is widened to dispose an additional light-shielding unit 41 in order to obtain the same quality level as that of Embodiment 5 with respect to the oblique-view color mixture, whereby the oblique light is shielded.

Figure 11:
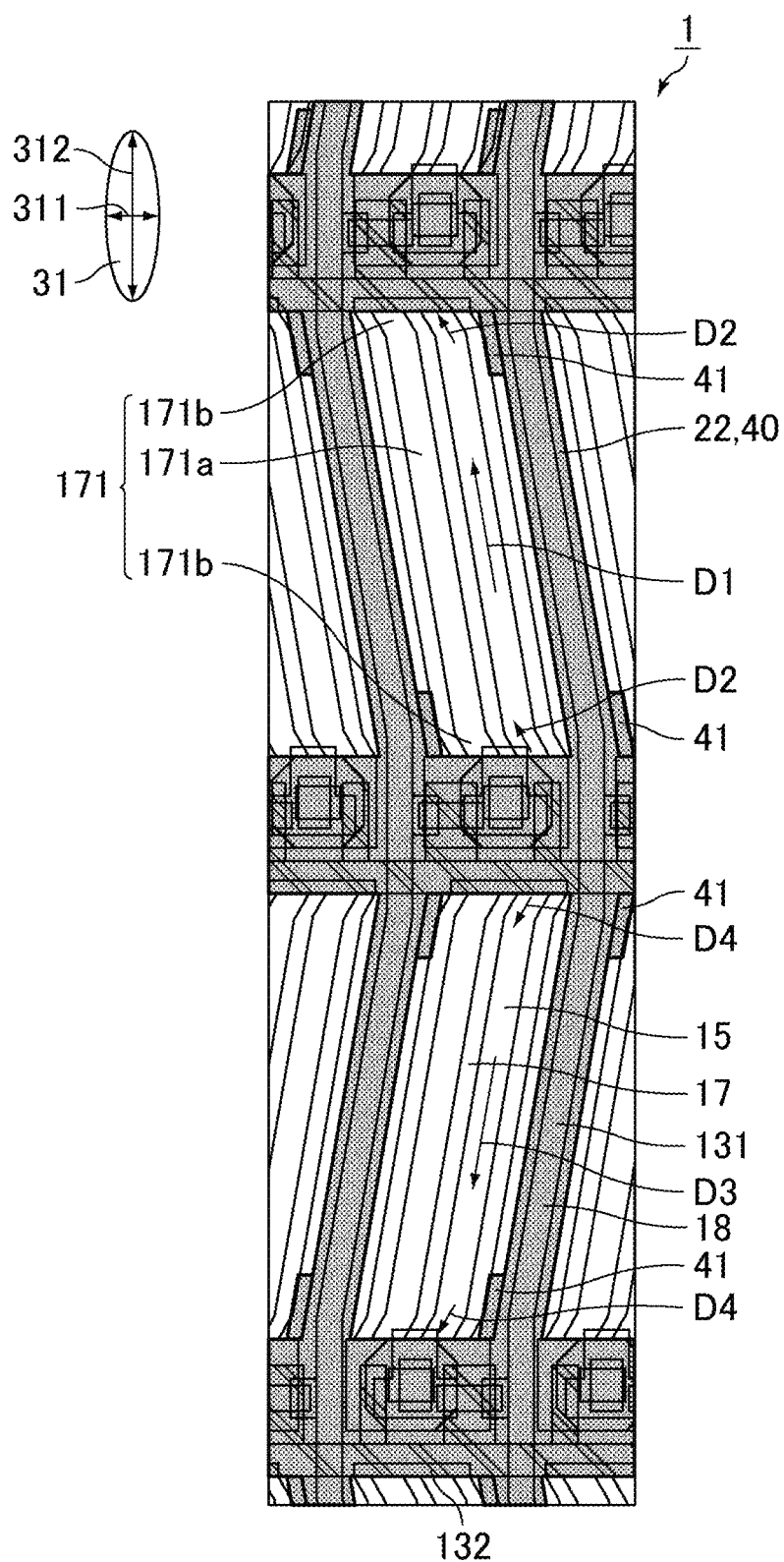
FIG. 11 is a schematic plan view illustrating a liquid crystal display device according to Embodiment 6.

FIG. 11 is a schematic plan view illustrating a liquid crystal display device according to Embodiment 6. In Embodiment 6, a black matrix 22 provided on a second substrate 20 is used as a light-shielding member 40 including the additional light-shielding unit 41. The black matrix 22 that is the light-shielding member 40 is widened on the side of a farther sub-slit 171*b* in sub-slits 171*b* disposed in sub-pixels 2 having different colors on both sides of the black matrix 22 in a plan view. Consequently, the light-shielding member 40 is widened on the side on which the light in the oblique direction leaks more easily when the deviation of bonding of the substrate is generated, and the light in the oblique direction can be shielded by the second substrate 20 to suppress the oblique-view color mixture. The black matrix 22 is not widened on the side of the closer sub-slit 171*b* in the sub-slits 171*b* disposed in the sub-pixels 2 having different colors on both sides of the black matrix 22, so that the reduction of the aperture ratio can be suppressed as compared with the case that the black matrix 22 is widened on both sides. As described above, in Embodiment 6, as compared with the case that the black matrix 22 that is the light-shielding member 40 is widened onto both the sides, the oblique-view color mixture can also be suppressed while the reduction of the aperture ratio is suppressed, and the display quality can be secured.

As illustrated in FIG. 8, in Embodiment 5, because most of the additional light-shielding unit 41 provided on the first substrate 10 is disposed at a position overlapping the black matrix 22 provided on the second substrate 20, the reduction of the aperture ratio due to the disposition of the additional light-shielding unit 41 is not generated or is small. On the other hand, in Embodiment 6, as illustrated in FIG. 11, because the additional light-shielding unit 41 is formed using the black matrix 22, the aperture ratio is reduced as compared with Embodiment 5.

Embodiment 7

Features unique to Embodiment 7 will mainly be described, and the description of contents overlapping Embodiments 1 to 6 will be omitted. In Embodiment 5, the slit 171 is provided in the pixel electrode 17 disposed in the upper layer of the common electrode 15. On the other hand, in Embodiment 7, the dispositions of a common electrode and a pixel electrode are replaced with each other, and a slit is provided in the common electrode disposed in an upper layer of the pixel electrode. That is, in Embodiment 7, the pixel electrode is a first electrode and the common electrode is a second electrode.

Figure 12:
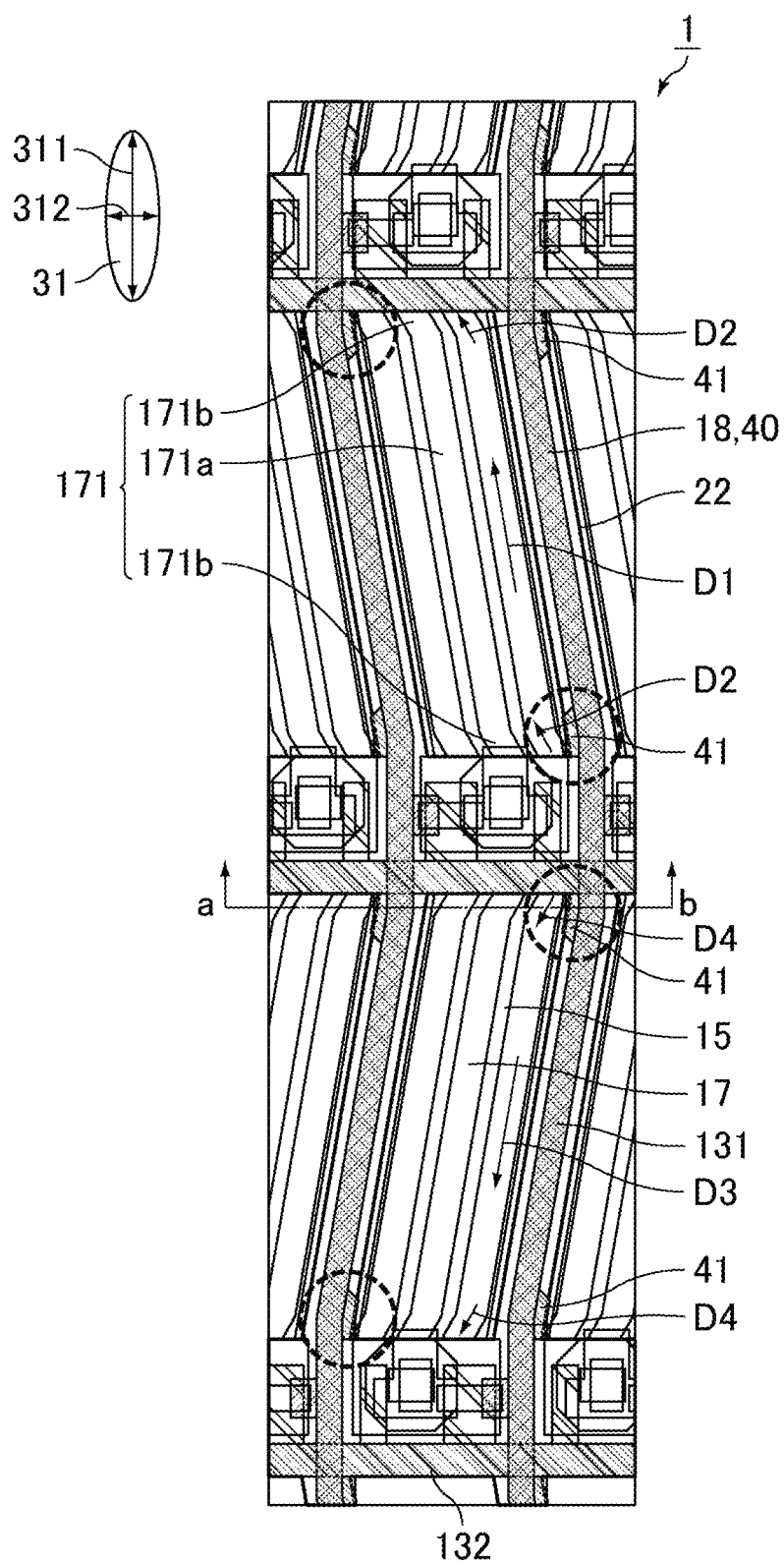
FIG. 12 is a schematic plan view illustrating a liquid crystal display device according to Embodiment 7.
Figure 13:
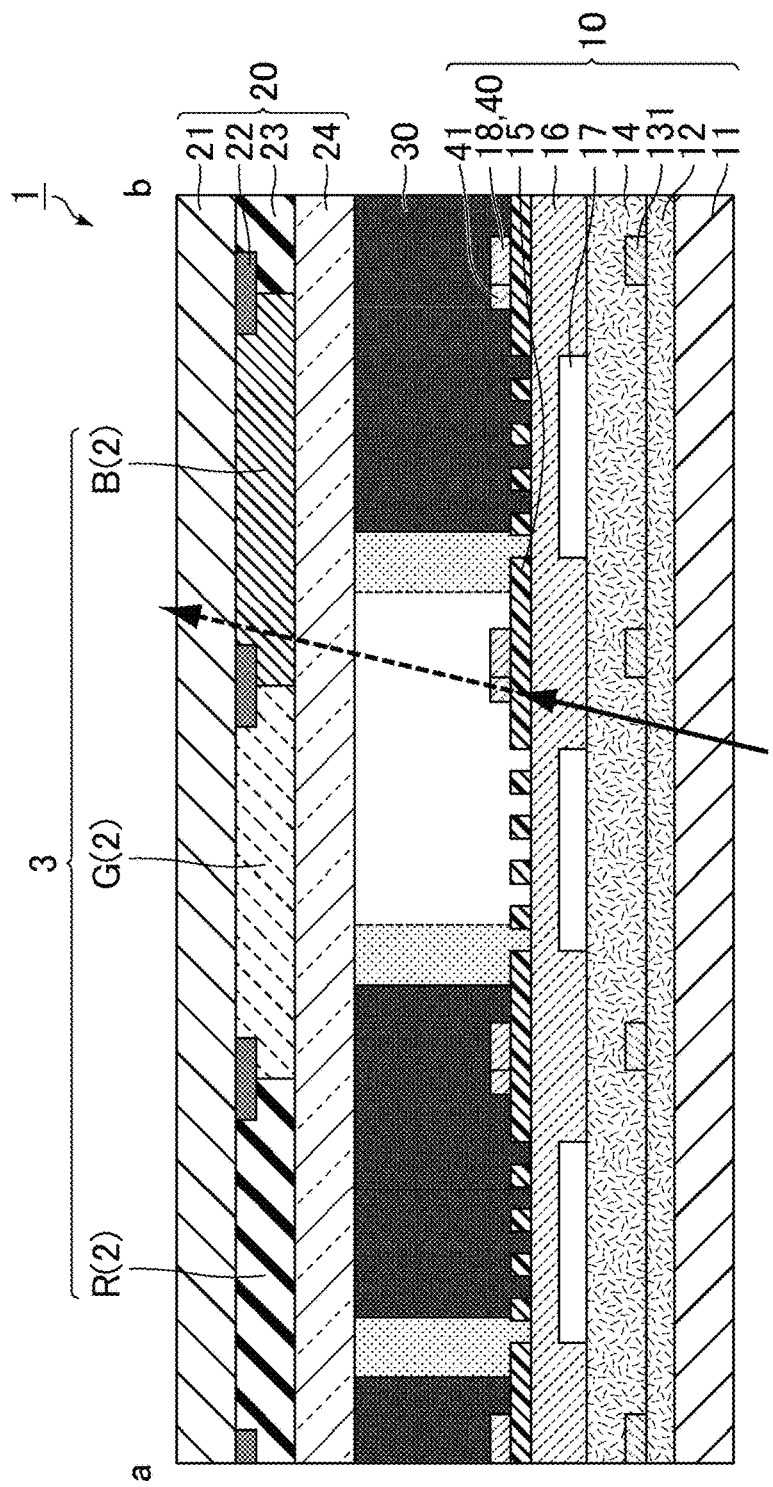
FIG. 13 is a schematic cross-sectional view illustrating the liquid crystal display device of Embodiment 7.

FIG. 12 is a schematic plan view illustrating a liquid crystal display device according to Embodiment 7. FIG. 13 is a schematic cross-sectional view illustrating the liquid crystal display device of Embodiment 7. FIG. 13 is a schematic cross-sectional view illustrating three sub-pixels along direction a-b in FIG. 12, and is a schematic cross-sectional view illustrating a sub-slit disposed at an end of the sub-pixel.

In Embodiment 7, the configuration in which a common electrode 15 including a slit 171 is disposed in an upper layer (on a side of a liquid crystal layer 30) while a pixel electrode 17 is disposed in a lower layer with an interlayer insulating film interposed therebetween is illustrated as a configuration example of the sub-pixel that generates the fringe electric field in the liquid crystal layer 30. When the slit is provided in the electrode in the uppermost layer (on the side of the liquid crystal layer), it is generally known that there is no particular problem with the FFS mode liquid crystal operation irrespective of which one of the common electrode and the pixel electrode is located on the upper layer side.

Embodiment 7 illustrates the configuration of the sub-pixel in which the resistance is decreased by disposing a metal line 18 in the same layer as the common electrode 15 formed by the transparent electrode similarly to Embodiment 5. At this point, similarly to Embodiment 5, by disposing an additional light-shielding unit 41 using the metal line 18 in a portion in which a sub-slit 171*b* comes close to a boundary center (the center of a black matrix 22 or the center of a data line 131) of a sub-pixel 2, a countermeasure against the oblique-view color mixture is taken, and the display quality can be secured without reducing the aperture ratio.

That is, in Embodiment 7, the metal line 18 that is a light-shielding member 40 provided on a first substrate 10 is widened on the side of the closer sub-slit 171*b* in the sub-slits 171*b* disposed in the sub-pixels 2 having different colors on both sides of the data line 131. Consequently, the light-shielding member 40 is widened on the side on which the light in the oblique direction leaks more easily when a deviation of the bonding of the substrate is generated, and the light in the oblique direction can be shielded by the first substrate 10 to suppress the oblique-view color mixture. The metal line 18 is not widened on the side of the farther sub-slit 171*b* in the sub-slits 171*b* disposed in the sub-pixels 2 having different colors on both sides of the data line 131, so that the reduction of the aperture ratio can be suppressed as compared with the case that the metal line 18 is widened on both sides. Thus, in Embodiment 7, as compared with the case that the metal line 18 that is the light-shielding member 40 is widened to both the sides, the oblique-view color mixture can be suppressed while the reduction of the aperture ratio is suppressed, and the display quality can be secured.

In Embodiment 7, in order to solve the same problem as Embodiment 5, the additional light-shielding unit 41 is disposed in the metal line 18 so as to be able to follow the direction in which the light is transmitted from the oblique view. The position of the additional light-shielding unit 41 of Embodiment 7 is provided diagonally when viewed with one sub-pixel 2.

Figure 14:
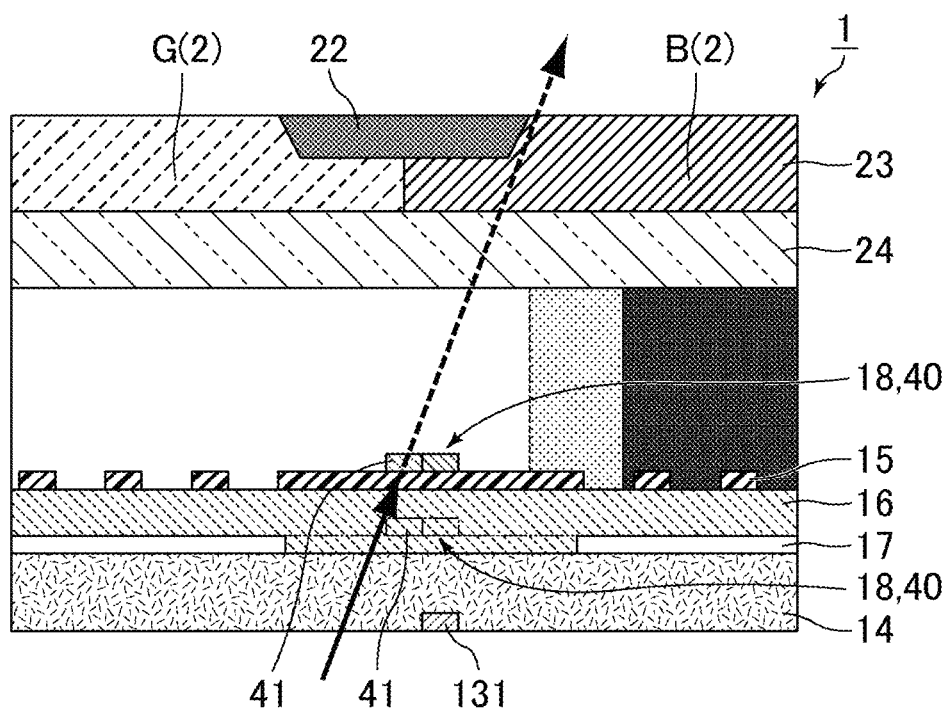
FIG. 14 is a schematic cross-sectional view illustrating the light shielding in the oblique direction in the liquid crystal display device of Embodiment 7.

FIG. 14 is a schematic cross-sectional view illustrating the light shielding in the oblique direction in the liquid crystal display device of Embodiment 7. In order to compare the light-shielding situation of the oblique-view color mixture between the aspect (Embodiment 5) in which the light is shielded by the metal line 18 contacting with the common electrode 15 in the case that the pixel electrode 17 is disposed closer to the side of the liquid crystal layer 30 with respect to the common electrode 15 and the aspect (Embodiment 7) in which the light is shielded by the metal line 18 contacting with the common electrode 15 in the case that the common electrode 15 is disposed closer to the side of the liquid crystal layer 30 with respect to the pixel electrode 17, the place where the metal line 18 that is the light-shielding member 40 of Embodiment 5 is disposed is virtually indicated by a broken line in the schematic cross-sectional view of the embodiment 7 in FIG. 14.

As illustrated in FIG. 14, the effect of shielding the light from the same angle is higher in the case that the light is shielded on the side close to the liquid crystal layer 30. Thus, in Embodiment 7 in which the light is shielded by the metal line 18 close to the liquid crystal layer 30, a light-shielding width can be reduced to further narrow the width of the additional light-shielding unit 41 as compared with Embodiment 5. Consequently, the oblique-view color mixture is suppressed while the reduction of the aperture ratio is further suppressed, and the display quality can be secured.

In the case that the light is shielded by the data line 131, a parasitic capacitance, such as a capacitance between the data line 131 and the common electrode 15, which is undesirable to secure the pixel display quality, is generated by partially widening the data line 131, and a possibility of degradation of the display quality such as the crosstalk arises. However, the concern about the degradation of the display quality is not generated in the light-shielding by the metal line 18 similarly to Embodiment 5.

Embodiment 8

Features unique to Embodiment 8 will mainly be described, and the description of contents overlapping Embodiments 1 to 7 will be omitted. In Embodiment 7, the metal line 18 provided on the first substrate 10 is used as the light-shielding member 40 including the additional light-shielding unit 41. On the other hand, in Embodiment 8, a black matrix on a second substrate side is widened to dispose an additional light-shielding unit 41 in order to obtain the same quality level as that of Embodiment 7 with respect to the oblique-view color mixture, whereby the oblique light is shielded.

Figure 15:
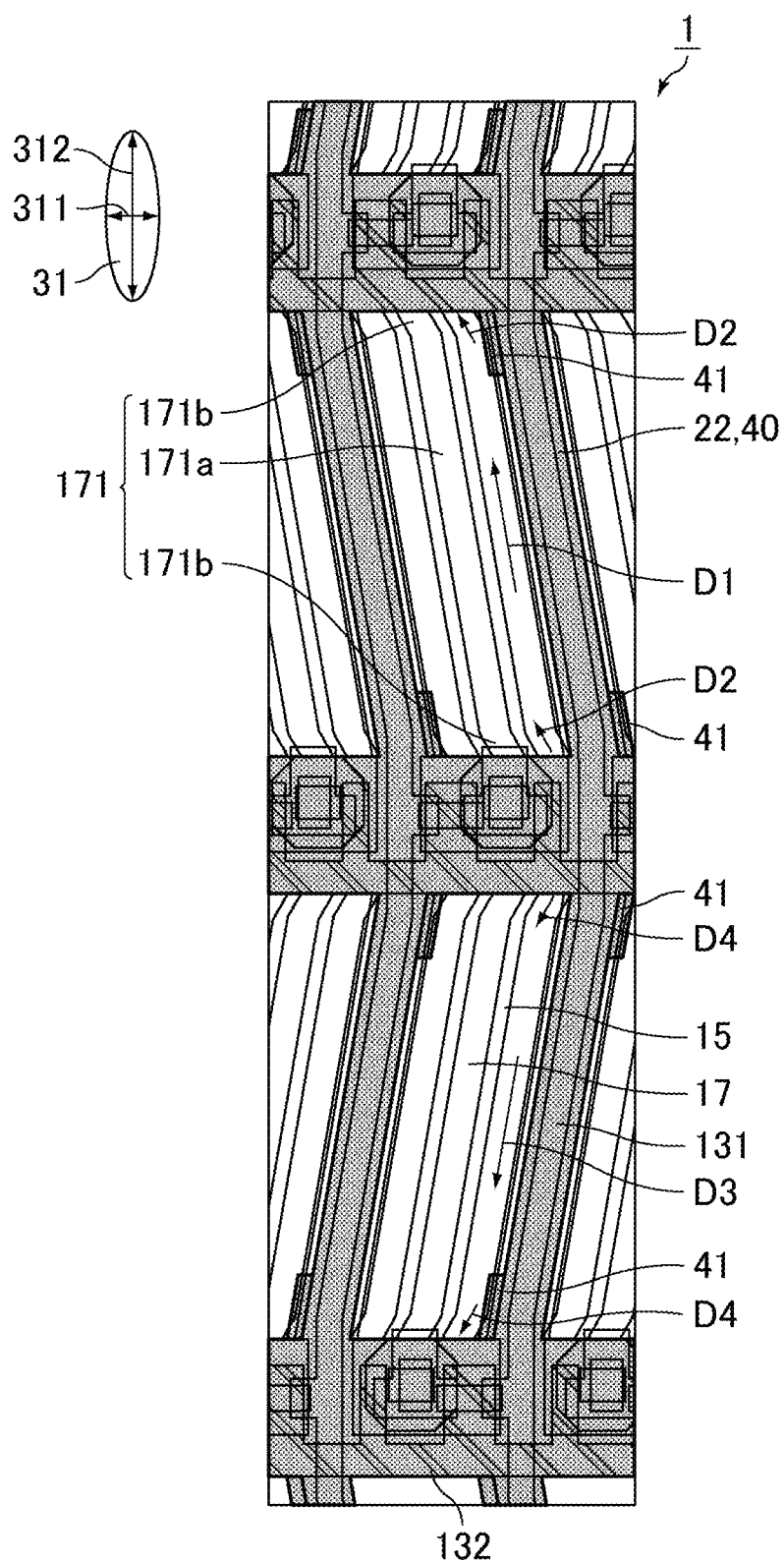
FIG. 15 is a schematic plan view illustrating a liquid crystal display device according to Embodiment 8.

FIG. 15 is a schematic plan view illustrating a liquid crystal display device according to Embodiment 8. In Embodiment 8, a black matrix 22 provided on a second substrate 20 is used as a light-shielding member 40. The black matrix 22 that is the light-shielding member 40 is widened on the side of a farther sub-slit 171*b* in sub-slits 171*b* disposed in sub-pixels 2 having different colors on both sides of the black matrix 22 in a plan view. Consequently, the light-shielding member 40 is widened on the side on which the light in the oblique direction leaks more easily when the deviation of bonding of the substrate is generated, and the light in the oblique direction can be shielded by the second substrate 20 to suppress the oblique-view color mixture. The black matrix 22 is not widened on the side of the closer sub-slit 171*b* in the sub-slits 171*b* disposed in the sub-pixels 2 having different colors on both sides of the black matrix 22, so that the reduction of the aperture ratio can be suppressed as compared with the case that the black matrix 22 is widened on both sides. As described above, in Embodiment 8, as compared with the case that the black matrix 22 that is the light-shielding member 40 is widened onto both the sides, the oblique-view color mixture can also be suppressed while the reduction of the aperture ratio is suppressed, and the display quality can be secured.

As illustrated in FIG. 11, in Embodiment 7, because most of the additional light-shielding unit 41 provided on the first substrate 10 is disposed at a position overlapping the black matrix 22 provided on the second substrate 20, the reduction of the aperture ratio due to the disposition of the additional light-shielding unit 41 is not generated or is small. On the other hand, in Embodiment 8, as illustrated in FIG. 15, because the additional light-shielding unit 41 is formed using the black matrix 22, the aperture ratio is reduced as compared with Embodiment 7.

Embodiment 9

Features unique to Embodiment 9 will mainly be described, and the description of contents overlapping Embodiments 1 to 8 will be omitted. Embodiment 9 has the same configuration as that of Embodiment 1 except that the shape of the data line 131 is different.

Figure 16:
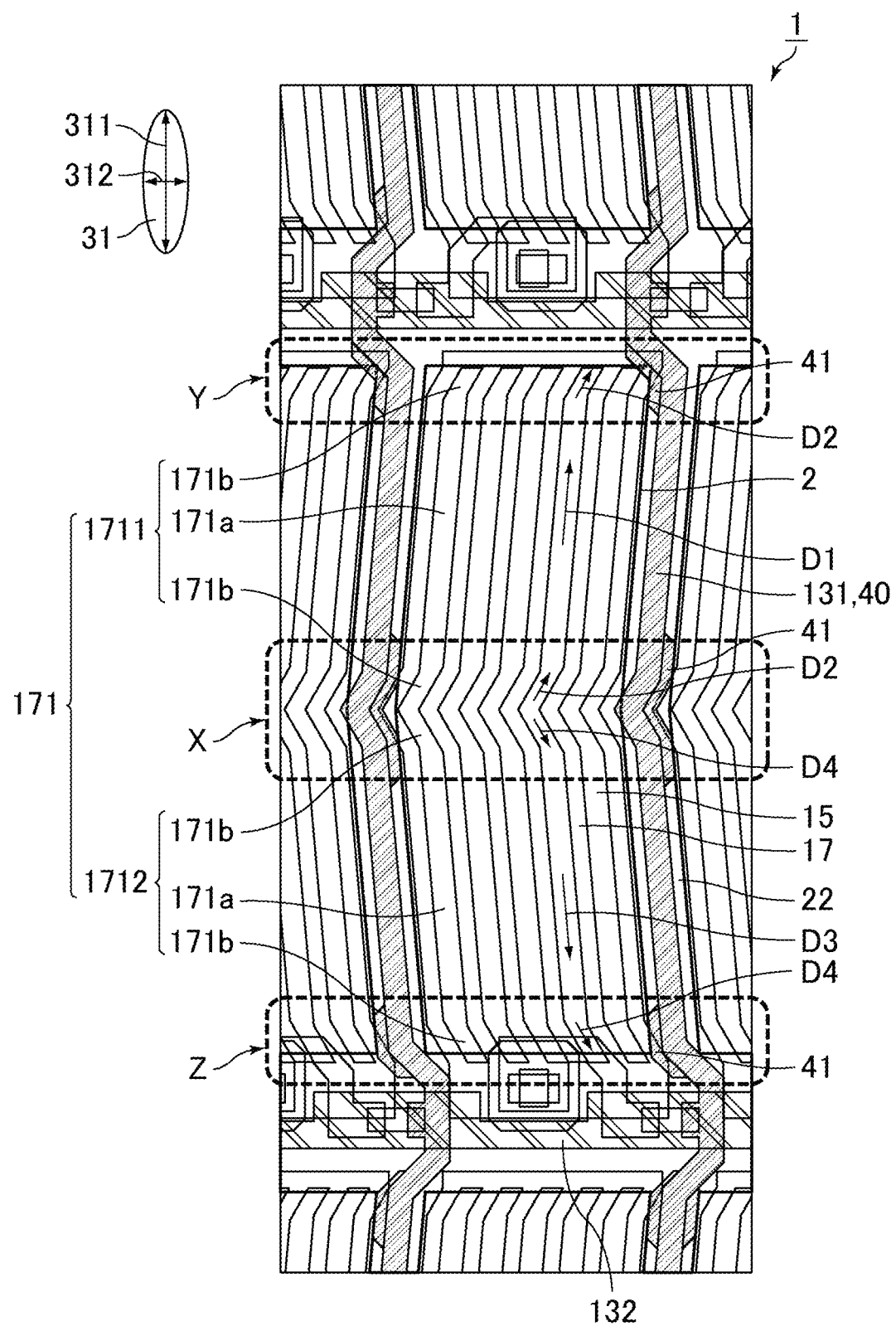
FIG. 16 is a schematic plan view illustrating a liquid crystal display device according to Embodiment 9.
Figure 17:
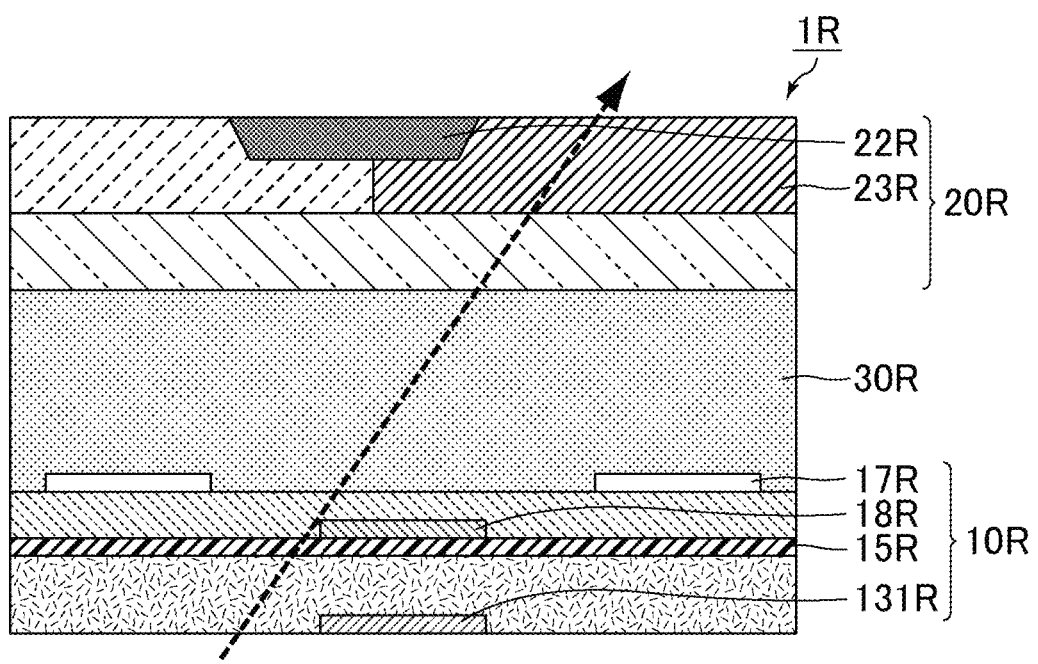
FIG. 17 is a view illustrating a liquid crystal display device according to a comparative embodiment, and is a schematic cross-sectional view in the case that a CF substrate deviates to a left side in bonding of a TFT substrate and the CF substrate.
Figure 18:
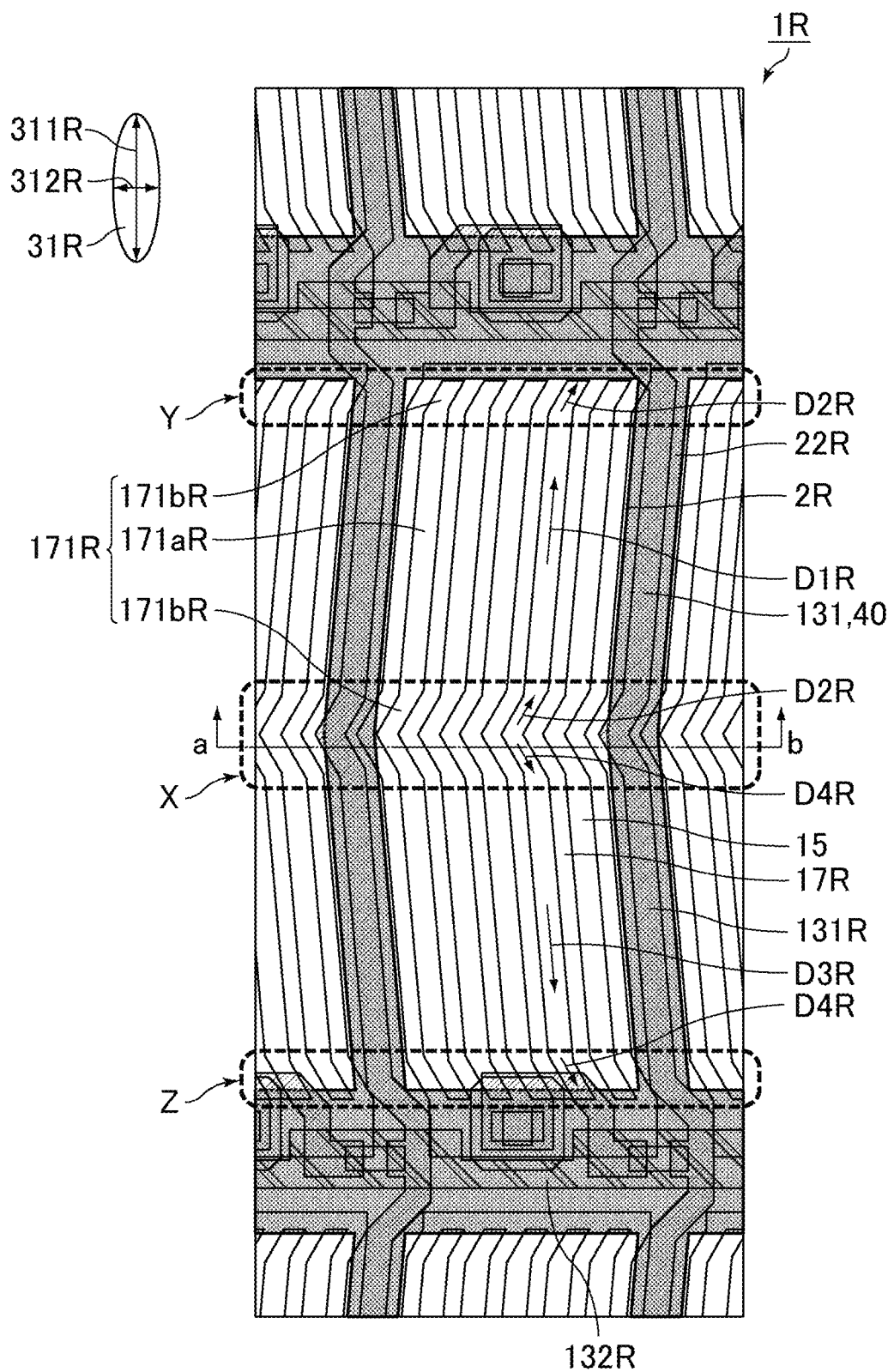
FIG. 18 is a schematic plan view illustrating the liquid crystal display device of the comparative embodiment.
Figure 19:
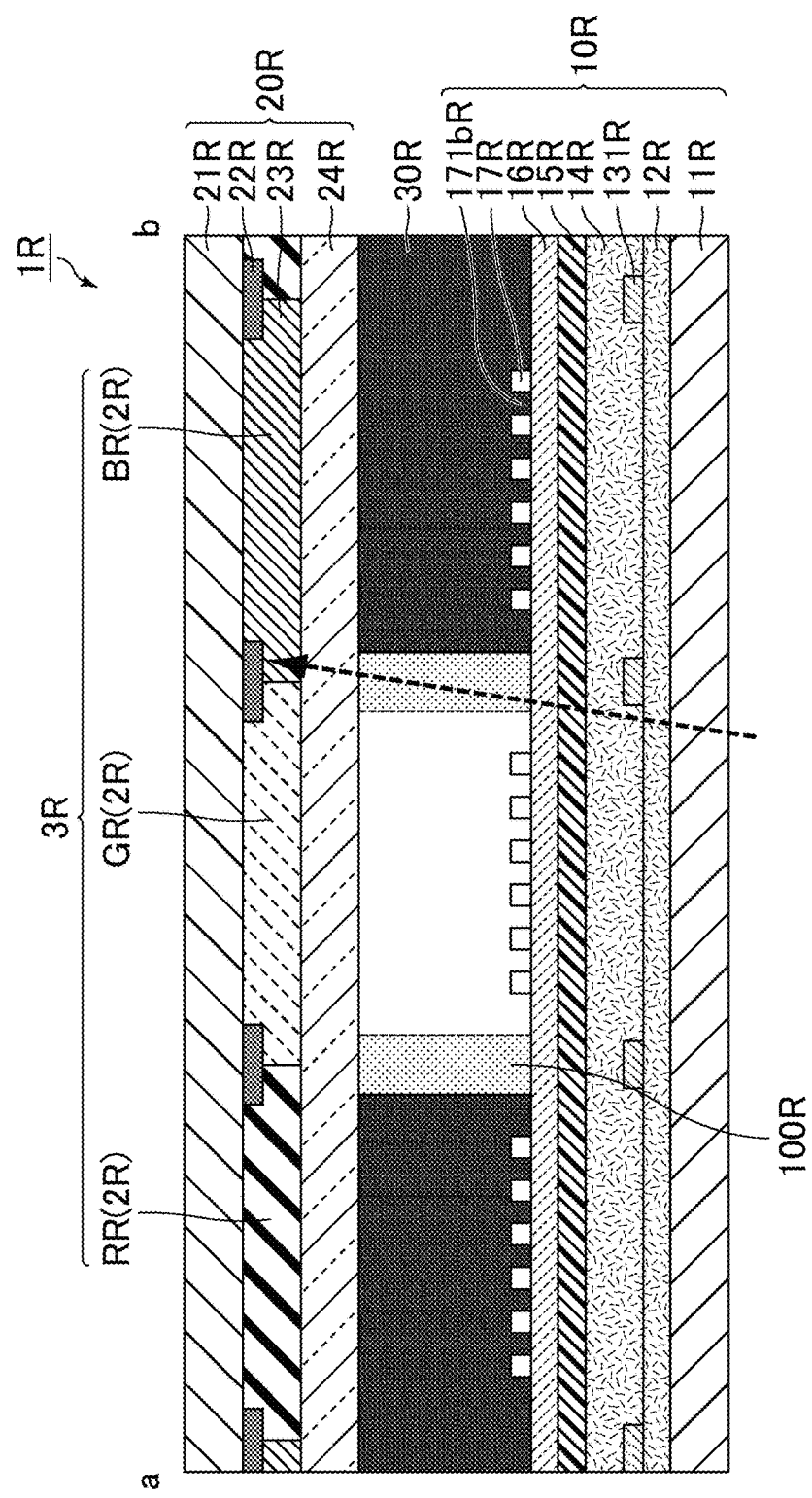
FIG. 19 is a view illustrating the liquid crystal display device of the comparative embodiment, and is a schematic cross-sectional view in the case that the deviation is not generated between the TFT substrate and the CF substrate in the bonding of the TFT substrate and the CF substrate.
Figure 20:
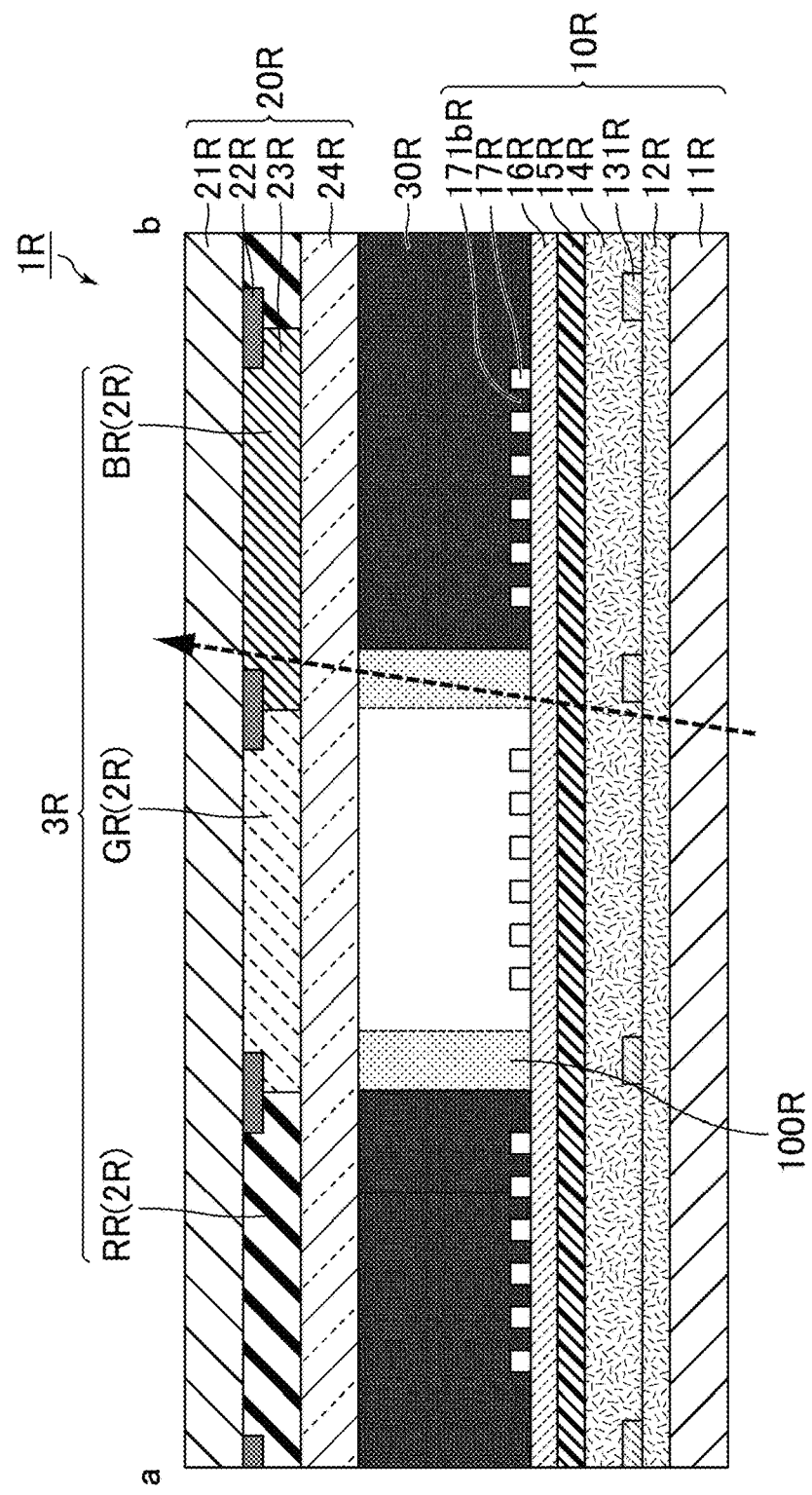
FIG. 20 is a view illustrating the liquid crystal display device of the comparative embodiment, and is a schematic cross-sectional view in the case that the deviation is generated between the TFT substrate and the CF substrate in the bonding of the TFT substrate and the CF substrate.
Figure 21:
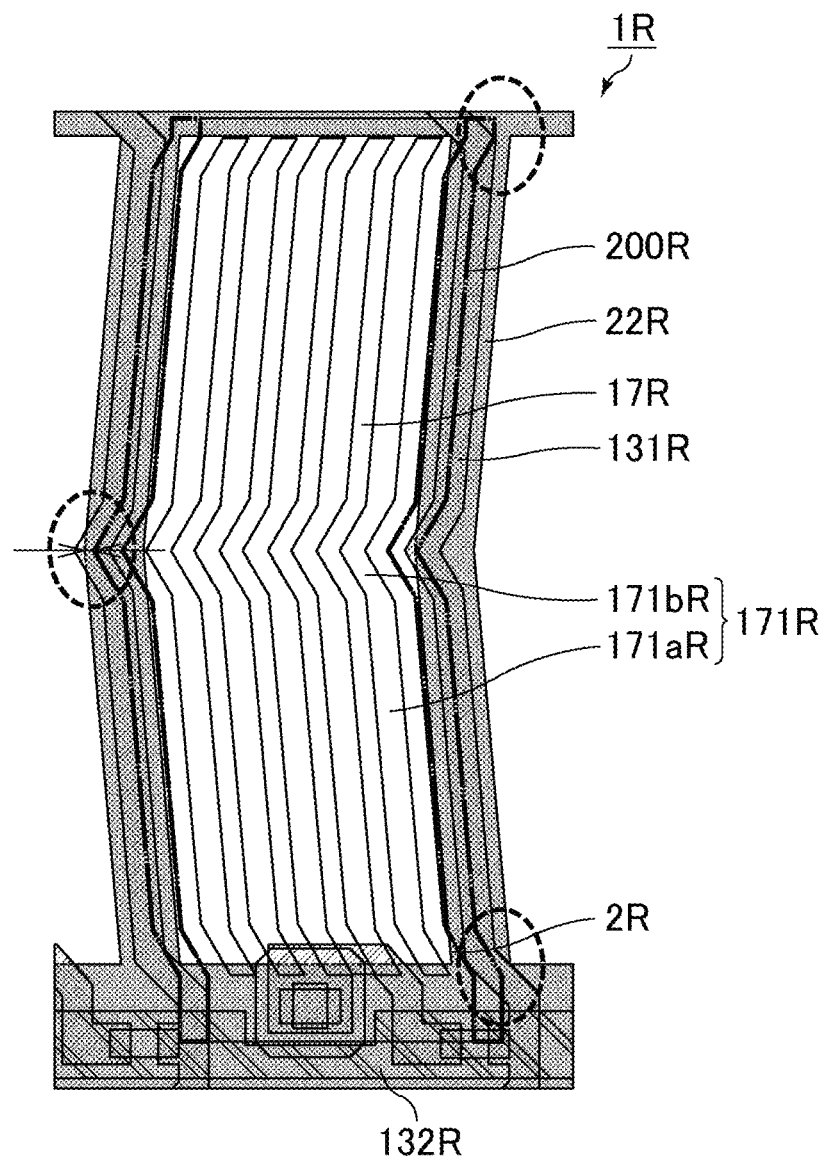
FIG. 21 is a schematic plan view illustrating light leakage of the liquid crystal display device of the comparative embodiment.

FIG. 16 is a schematic plan view illustrating a liquid crystal display device according to Embodiment 9. In Embodiment 1, the data line 131 is designed according to the center of the black matrix 22 without adjusting the shape of the data line 131 in the portion in which the slit 171 of the pixel electrode 17 is formed in a V-shape. On the other hand, in Embodiment 9, a data line 131 is bent in the V-shape so as to follow the shape of a slit 171 of a pixel electrode 17 in the portion in which the slit 171 of the pixel electrode 17 is formed in the V-shape.

In Embodiment 9, as described above, for the purpose of alignment stabilization of liquid crystal molecules 31, a sub-slit 171b in which the angle is tilted more than a main slit 171a is provided in a central portion X of a sub-pixel and at an upper end Y and a lower end Z of the sub-pixel. Similarly to Embodiment 1, a data line 131 that is a light-shielding member 40 provided on a first substrate 10 is widened on the side of the closer sub-slit 171b in the sub-slits 171b disposed in the sub-pixels 2 having different colors on both sides of the data line 131. Consequently, the light-shielding member 40 is widened on the side on which the light in the oblique direction leaks more easily when a deviation of the bonding of the substrate is generated, and the light in the oblique direction can be shielded by the first substrate 10 to suppress the oblique-view color mixture. The data line 131 is not widened on the side of the farther sub-slit 171b in the sub-slits 171b disposed in the sub-pixels 2 having different colors on both sides of the data line 131, so that the reduction of the aperture ratio can be suppressed as compared with the case that the data line 131 is widened on both sides. Thus, in Embodiment 9, as compared with the case that the data line 131 that is the light-shielding member 40 is widened to both the sides, the oblique-view color mixture can be suppressed while the reduction of the aperture ratio is suppressed, and the display quality can be secured.

In the liquid crystal display device 1 of Embodiment 9 in which the data line 131 is provided along the V-shaped portion of the slit 171 of the pixel electrode 17, because there is a possibility of spreading the region where the light-shielding member is disposed in a plan view as compared with the liquid crystal display device 1 of Embodiment 1 in which the data line 131 is designed according to the center of the black matrix 22, not extending along the V-shaped portion of the slit 171 of the pixel electrode 17, from the viewpoint of increasing the aperture ratio, it can be said that the liquid crystal display device 1 of Embodiment 1 is a more preferable than the liquid crystal display device 1 of Embodiment 9.

What is claimed is:

1. A liquid crystal display device comprising:
    a first substrate;
    a second substrate opposed to the first substrate;
    a liquid crystal layer that is sandwiched between the first substrate and the second substrate and includes a liquid crystal molecule; and
    a plurality of pixels each of which includes a plurality of sub-pixels having a plurality of colors, wherein
    at least one of the first substrate or the second substrate includes a light-shielding member at least between adjacent sub-pixels having different colors,
    the first substrate includes a first electrode that is one of a pixel electrode and a common electrode, an interlayer insulating film provided on the first electrode, a second electrode provided on the interlayer insulating film sequentially toward the liquid crystal layer, the second electrode being the other of the pixel electrode and the common electrode, a data line, and a scanning line,
    a slit is provided in each sub-pixel in the second electrode,
    the slit includes a main slit extending in a first direction and a sub-slit that is connected to an end of the main slit and extends in a second direction,
    an angle between an axial direction with a larger dielectric constant selected from a long axis direction and a short axis direction of the liquid crystal molecule in an initial alignment state and the second direction is larger than an angle between the axial direction and the first direction,
    the light-shielding member includes an additional light-shielding structure,
    a distance between the main slit adjacent to the light-shielding member and the light-shielding member is constant in a portion where the additional light-shielding structure is not provided, and the distance between the main slit adjacent to the light-shielding member and the light-shielding member decreases in a portion where the additional light-shielding structure is provided,
    when the light-shielding member is provided on the first substrate, in a plan view, the additional light-shielding structure is on a side of a closer sub-slit among the sub-slits in the sub-pixels that have different colors and on both sides of the light-shielding member, and the additional light-shielding structure is not on a side of a farther sub-slit,
    a region where the additional light-shielding structure is provided is at least a portion of a region where the closer sub-slit is projected onto the light-shielding member in an extending direction of the scanning line,
    when the light-shielding member is provided on the second substrate, in the plan view, the additional light-shielding structure is on the side of the farther sub-slit among the sub-slits in the sub-pixels that have different colors and on both sides of the light-shielding member, and the additional light-shielding structure is not on the side of the closer sub-slit, and
    the region where the additional light-shielding structure is provided is at least a portion of a region where the farther sub-slit is projected onto the light-shielding member in the extending direction of the scanning line.

2. The liquid crystal display device according to claim 1, wherein
    the first substrate includes a data line, and
    the light-shielding member is the data line.

3. The liquid crystal display device according to claim 1, wherein
    the first substrate includes a metal line contacting with the common electrode, and
    the light-shielding member is the metal line.

4. The liquid crystal display device according to claim 3, wherein
    the pixel electrode is the first electrode, and
    the common electrode is the second electrode.

5. The liquid crystal display device according to claim 3, wherein
    the pixel electrode is the second electrode, and
    the common electrode is the first electrode.

6. The liquid crystal display device according to claim 2, wherein
    the second substrate includes a black matrix that overlaps the light-shielding member in the plan view, and the light-shielding member is widened in a region where the black matrix is disposed in the plan view.

7. The liquid crystal display device according to claim 1, wherein the second substrate includes a black matrix, and
the light-shielding member is the black matrix.

* * * * *